(12) United States Patent
Cuk

(10) Patent No.: US 8,350,538 B2
(45) Date of Patent: Jan. 8, 2013

(54) VOLTAGE STEP-DOWN SWITCHING DC-TO-DC CONVERTER

(75) Inventor: Slobodan Cuk, Laguna Niguel, CA (US)

(73) Assignee: Cuks, LLC, Irvine, CA (US)

( * ) Notice: Subject to any disclaimer, the term of this patent is extended or adjusted under 35 U.S.C. 154(b) by 433 days.

(21) Appl. No.: 12/798,687

(22) Filed: Apr. 10, 2010

(65) Prior Publication Data

US 2010/0259241 A1    Oct. 14, 2010

Related U.S. Application Data

(60) Provisional application No. 61/212,374, filed on Apr. 11, 2009.

(51) Int. Cl.
*G05F 1/656* (2006.01)
(52) U.S. Cl. .............................. 323/222; 323/224; 363/17
(58) Field of Classification Search .................. 323/222, 323/224, 233, 260, 289, 290, 299; 363/16–20, 363/76, 78, 98, 132
See application file for complete search history.

(56) References Cited

U.S. PATENT DOCUMENTS

| 4,184,197 | A | 1/1980 | Cuk et al. | |
| 4,257,087 | A | 3/1981 | Cuk | |
| 6,304,460 | B1 * | 10/2001 | Cuk | 363/16 |
| 6,930,893 | B2 * | 8/2005 | Vinciarelli | 363/17 |
| 7,145,786 | B2 * | 12/2006 | Vinciarelli | 363/17 |

* cited by examiner

*Primary Examiner* — Rajnikant Patel

(57) ABSTRACT

A number of non-isolated and isolated converter embodiments are disclosed all featuring the three switches and characteristic not present in prior-art converters such as: a) reduced voltage stresses on all three switches resulting in safe operation without a danger of voltage overstress of any of the three switches over the full operating range from duty ratio of 0 to 1.0 and thus resulting in wide input voltage operating. b) operating range with magnetics flux and magnetic size much reduced compared to prior-art converters c) stressless switching eliminates switching losses and reduces stresses which are present in prior-art converters. All three features result in simultaneous increase of efficiency, reduction of size and cost when compared with prior-art converters.

12 Claims, 38 Drawing Sheets

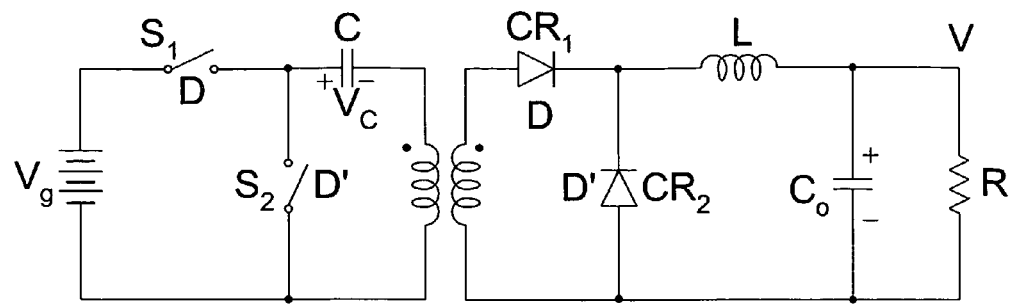
Fig. 6a (Prior art)
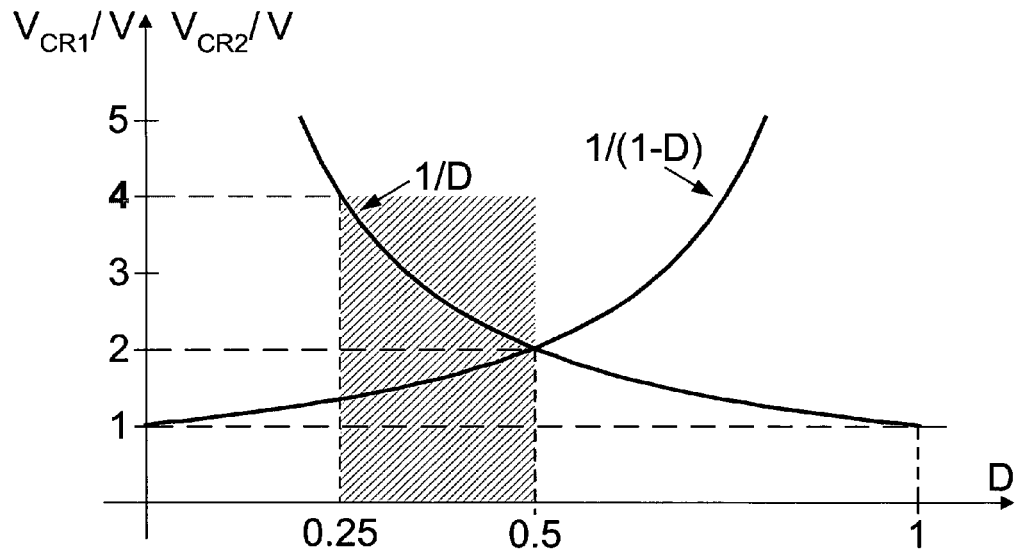
Fig. 6b (Prior-art)
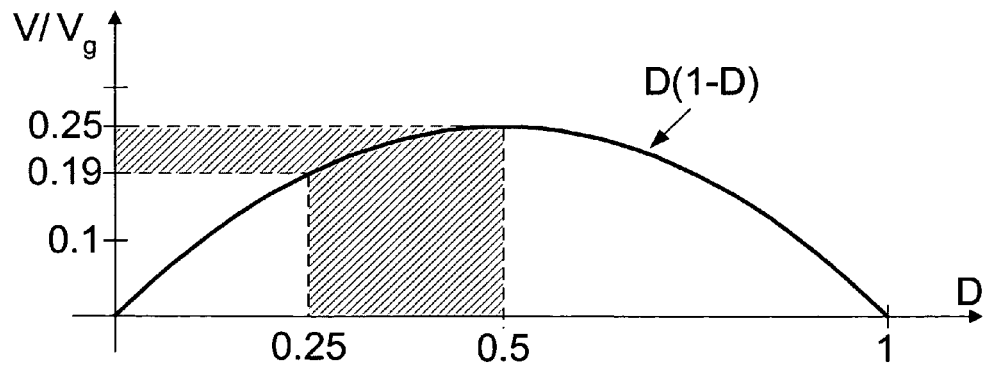
Fig. 6c (Prior-art)

VOLTAGE STEP-DOWN SWITCHING DC-TO-DC CONVERTER

CROSS-REFERENCE TO RELATED APPLICATIONS

Provisional U.S. Patent Application No. 61/212,374
Filed on Apr. 11, 2009
Applicant: Slobodan Cuk
Title: Voltage Step-down Switching DC-to-DC Converter
Confirmation Number: 3710

FIELD OF THE INVENTION

The non-isolated switching DC-to-DC converters can be broadly divided into three basic categories based on their input to output DC voltage conversion characteristics: a) step-down only (buck converter), step-up only (boost converter) and step down/step-up (flyback, SEPIC, and Ćuk converters). This invention relates to the step-down class of switching DC-to-DC power converters with a DC gain characteristic being linear function of controlling duty ratio D of the main switch.

Another classification can be made with respect to the converters ability to have galvanically isolated versions. The present invention introduces several practical isolated versions so that the transformer step-down turns ratio further helps in providing the large step-down conversion in an efficient manner.

Classifications of currently known switching converters can also be made based on the type of the voltage and current waveforms exhibited by the switches into three broad categories:
a) Square-wave switched-mode conversion in which switch voltages and switch currents are square-waves;
b) Resonant converters (such as series resonant and parallel resonant converters) in which either or both switch voltage and/or switch currents are sinusoidal-like with their peak magnitude several times higher than the square wave equivalent resulting in higher voltage and or current switch stresses than square-wave converters;
c) Quasi-Resonant Square-Wave converters, which are Square-wave converters modified by insertion of the resonant components, resonant inductors and/or resonant capacitors with objective to modify the switching transitions so that switching losses would be reduced.

They also result in increased either voltage or current stresses on the switches or both.

The present invention creates a fourth category which consist of the hybrid switching consisting of two switching intervals, square-wave interval and resonant interval which are made possible by a unique three switch converter topologies as opposed to the two or four switch topologies as used in all prior art converters of the three categories described above.

Another classification can be made with respect to number of switches used, such as two, four, six etc. The present switched-mode conversion theory a-priori excludes the converters with the odd number of switches, such as 3 switches, 5 switches etc. The present invention breaks the new ground by introducing for the first time the switching converters featuring three switches, which results in hybrid switched mode power conversion method and results in very high conversion efficiency.

Definitions and Classifications

The following notation is consistently used throughout this text in order to facilitate easier delineation between various quantities:

1. DC—Shorthand notation historically referring to Direct Current but by now has acquired wider meaning and refers generically to circuits with DC quantities;
2. AC—Shorthand notation historically referring to Alternating Current but by now has acquired wider meaning and refers to all Alternating electrical quantities (current and voltage);
3. $i_1$, $v_2$—The instantaneous time domain quantities are marked with lower case letters, such as $i_1$ and $v_2$ for current and voltage;
4. $I_1$, $V_2$—The DC components of the instantaneous periodic time domain quantities are designated with corresponding capital letters, such as $I_1$ and $V_2$;
5. $\Delta v$—The AC ripple voltage on energy transferring capacitor C;
6. $f_S$—Switching frequency of converter;
7. $T_S$—Switching period of converter inversely proportional to switching frequency $f_S$;
8. S—Controllable switch with two switch states: ON and OFF;
9. $T_{ON}$—ON-time interval $T_{ON}=DT_S$ during which switch S is turned ON;
10. $T_{OFF}$—OFF-time interval $T_{OFF}=D'T_S$ during which switch S is turned OFF;
11. D—Duty ratio of the main controlling switch S;
12. S'—switch which operates in complementary way to switch S: when S is closed S' is open and opposite, when S is open S' is closed;
13. D'—Complementary duty ratio D'=1−D of the switch S' complementary to main controlling switch S;
14. $f_r$—Resonant switching frequency defined by resonant inductor $L_r$ and energy transferring capacitor C;
15. $T_r$—Resonant period defined as $T_r=1/f_r$;
16. $t_r$—One half of resonant period $T_r$;
17. CR—Two-terminal Current Rectifier whose ON and OFF states depend on controlling S switch states and resonant period $T_r$;

BRIEF DESCRIPTION OF THE DRAWINGS

FIG. 1b shows the switch states for the buck converter of FIG. 1a, and FIG. 1c illustrates DC voltage gain characteristic for buck converter of FIG. 1a.

FIG. 2c illustrates the second step during soft-switching in prior-art buck converter of FIG. 2a, FIG. 2d illustrates the third step during soft-switching in prior-art buck converter of FIG. 2a, and FIG. 2e illustrates the fourth step during soft-switching in prior-art buck converter of FIG. 2a.

FIG. 4a illustrates a prior-art forward converter and FIG. 4b shows the switch states for the forward converter of FIG. 4a.

FIG. 6a illustrates a prior-art asymmetric half bridge converter, FIG. 6b shows the voltage stress change of secondary side switches for the converter of FIG. 6a, and FIG. 6c shows the gain characteristic for the converter of FIG. 6a with shaded area showing the preferred operating region.

FIG. 12b shows an input current waveform of the converter of FIG. 7a, and FIG. 12c shows a DC gain characteristic of the converter in FIG. 7a.

FIG. 15b shows a current waveform through capacitor C of converter in FIG. 7a, FIG. 15c shows a current waveform through current rectifier CR of converter in FIG. 7a, and FIG. 15d shows the instantaneous voltage waveform across capacitor C of converter in FIG. 7a.

FIG. 16b shows a switching state of switch S and current waveform through the current rectifier CR of converter in FIG. 7a.

FIG. 20b shows a current waveform change with reduced switching frequency while $T_{OFF}$ time was kept the same as in FIG. 20a, and FIG. 20c shows a current waveform change with additional reduction in switching frequency while $T_{OFF}$ time was kept the same as in FIG. 20a.

PRIOR ART

Prior-Art Buck Converter

Figure 1A:
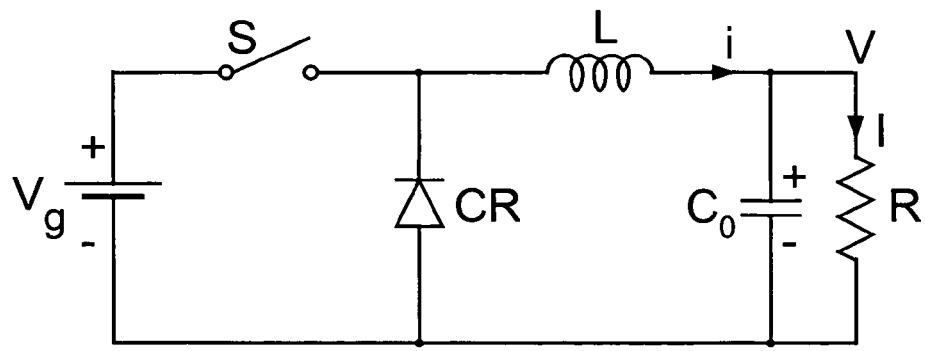
FIG. 1a illustrates a prior-art buck converter.
Figure 1B:
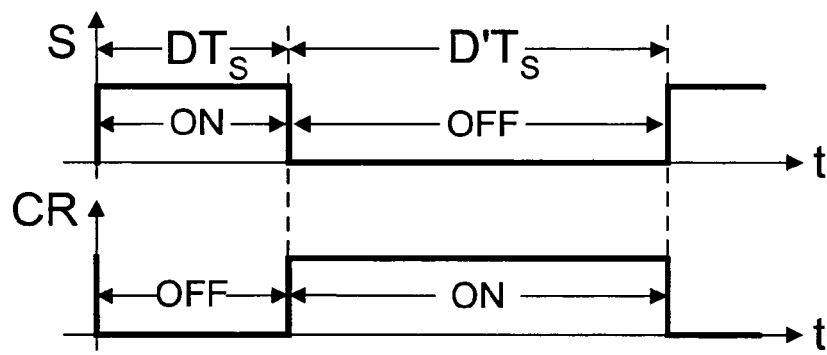
Figure 1C:
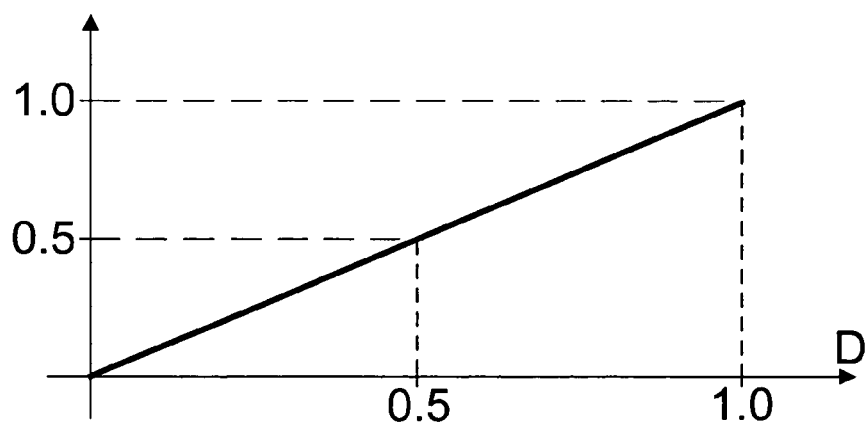

The non-isolated prior-art buck switching converter shown in FIG. 1a consists of two complementary switches: when S is ON, CR is OFF and vice versa (in continuous conduction mode) as shown by the switch states in FIG. 1b. It is capable of step-down only of the input DC voltage dependent of operating duty ratio D with ideal DC gain $V=DV_g$ as illustrated in FIG. 1c.

Figure 2A:
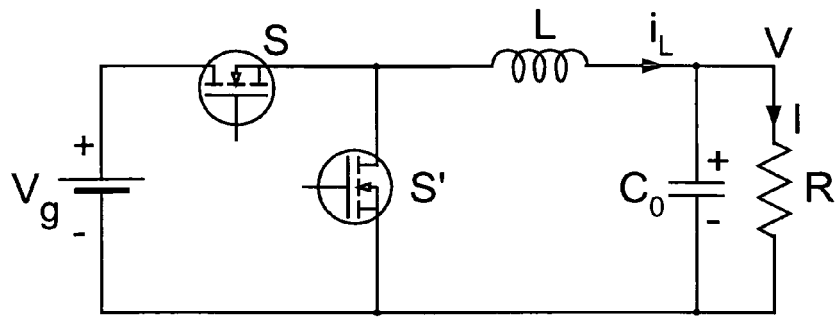
FIG. 2a shows a prior-art buck converter with two MOSFET switches.
Figure 2B:
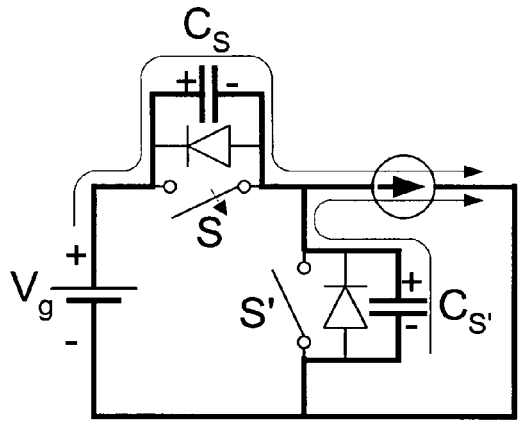
FIG. 2b illustrates the first step during soft-switching in prior-art buck converter of FIG. 2a where MOSFET switch is represented with an ideal switch having parasitic capacitor and body diode in parallel.
Figure 2C:
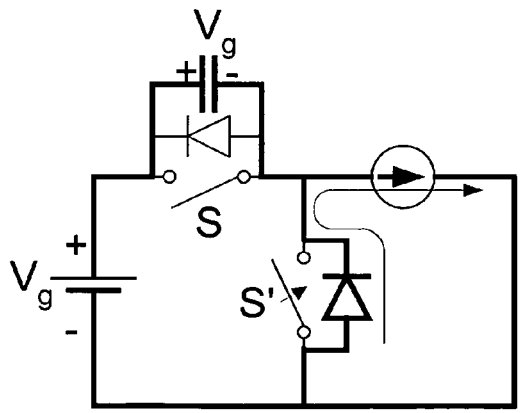
Figure 2D:
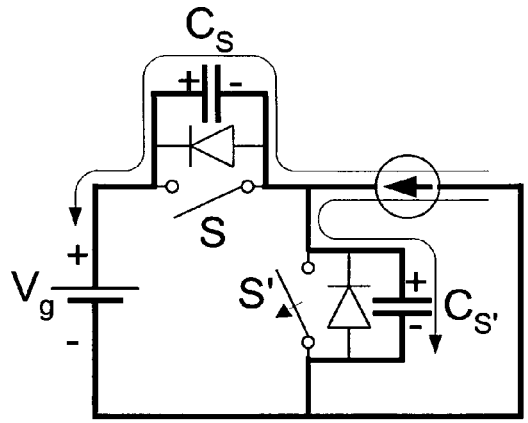
Figure 2E:
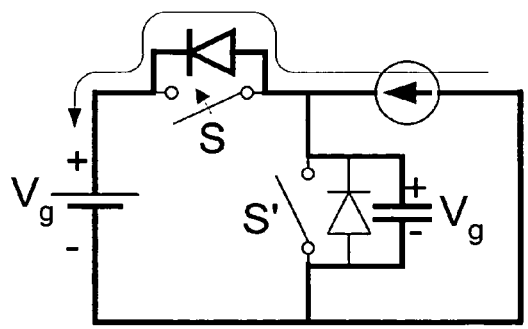

The buck converter of FIG. 1 has one serious drawback. It operates in hard-switching mode resulting in rather large switching losses, which prevents its operation at high switching frequencies and removes the possibility of reduction of size and cost. Many different methods were employed in the past in order to eliminate this deficiency of the basic hard-switching buck converter, all without a success. One such method is reviewed here so that it could be later compared with the new "stressless" switching operation of the present invention. As the first step toward "soft-switching" extension of the buck, both switches are implemented with N channel MOSFETs as illustrated in FIG. 2a. The replacement of the diode with a synchronous rectifier MOSFET has an added benefit of reducing the conduction losses of the diode in a low voltage high current applications.

Each of the two MOSFET switches in FIGS. 2b-e is replaced with its model consisting of an ideal switch, anti-parallel diode (body diode) and parasitic drain to source capacitance $C_S$. In hard switching mode operation with out of phase drive of the two switches (FIG. 1b) a large switching losses are incurred. When each switch is open, its parasitic capacitor is charged to input DC voltage $V_g$, thus storing a large energy on parasitic capacitors when the input DC voltage is high such as 400V for example. Upon closing of each switch this stored energy is dissipated so that the power lost is proportional to the square of input voltage and switching frequency as per equation (1):

$$P_{SW}=\frac{1}{2}C_S'V_g^2 f_S \quad (1)$$

Even though parasitic capacitance may be in pF range, due to large 400V voltage and high switching frequency (300 kHz) the total switching losses can become significant and result in loss of 3% to 5% of efficiency. Thus the method to eliminate or at least reduce these switching losses is desirable. One prior-art method is to operate the converter with very large inductor current ripple, so that instantaneous inductor current at the end of switching cycle is negative at $I_N$ as shown in FIG.

Figure 3A:
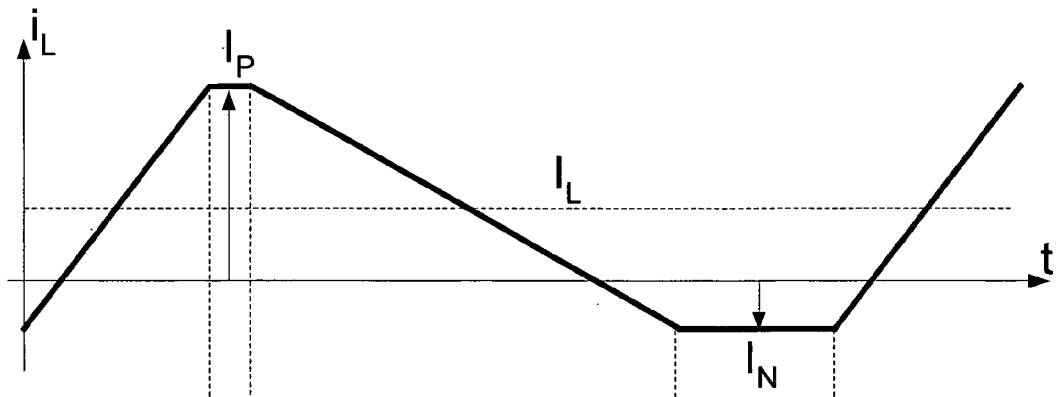
FIG. 3a illustrates a high ripple inductor current with positive peak $I_P$ and negative peak $I_N$ needed for soft-switching of the prior-art buck converter of FIG. 2a, FIG. 3b illustrates voltage change on two switches of the prior-art buck converter of FIG. 2a, and FIG. 3c illustrates the switch states for the prior-art buck converter of FIG. 2a with two "dead time" intervals $t_N$ and $t_P$ needed for soft-switching implementation.
Figure 3B:
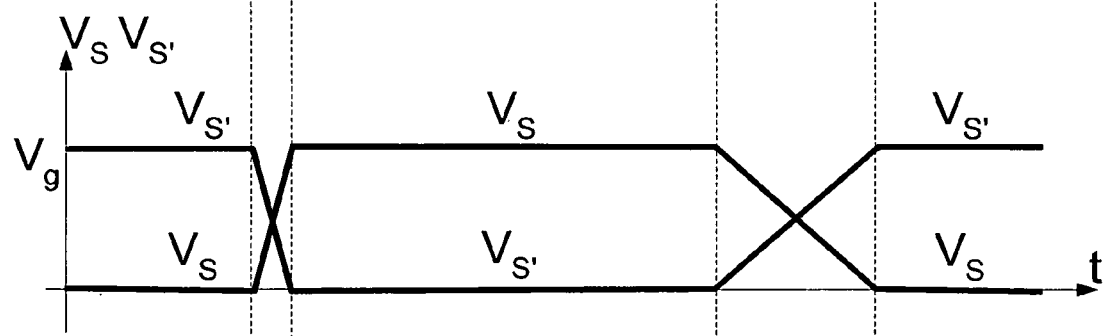
Figure 3C:
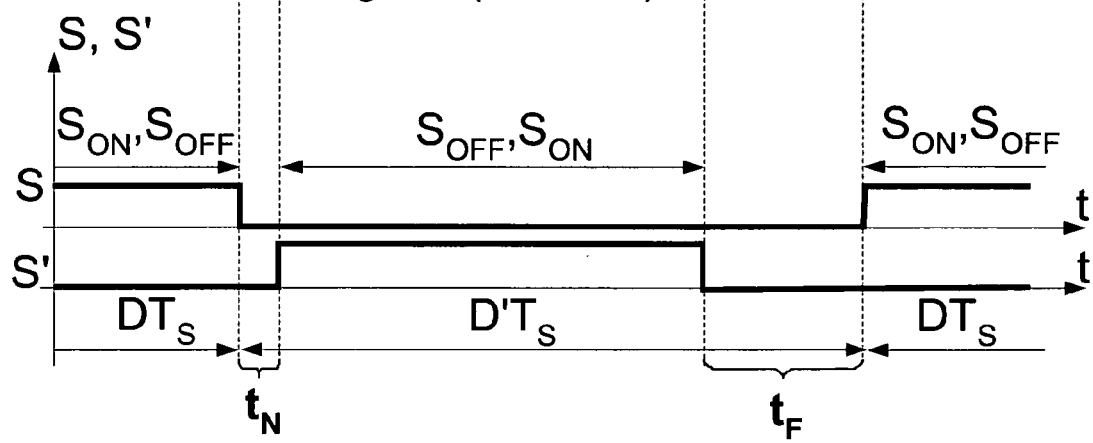

3a. The gate drives of the two active MOSFET switches then provide the "dead" times, $t_N$ and $t_F$, for transitions from ON state to OFF state for each switch respectively, such as illustrated with switch states in FIG. 3c. The positive inductor current at the end of $DT_S$ interval then exchanges the stored charges between the two capacitors, so that the voltage on S' switch is reduced to zero and turned ON at zero voltage with zero switching losses. The opposite takes place during the second, so called forced transition, and the voltage on main switch S is reduced to zero, when its body diode turns ON resulting in zero voltage turn-ON and elimination of switching losses. As a result the switching losses due to charge stored on parasitic capacitances is indeed eliminated. Unfortunately, this "soft switching" method has two significant practical drawbacks:
 1. High conduction losses of the inductor which to large extent offset the switching loss reduction.
 2. The large inductor ripple current makes for an ineffective inductive filtering since a large output capacitor is then needed to reduce output ripple voltage to acceptable levels.

The present invention eliminates both of these problems resulting in full benefits of switching loss elimination.

The buck converter has a number of single ended transformer-coupled extensions, such as forward converter and asymmetric half-bridge extensions. The following review uncovers the serious shortcomings of these isolated converters, which have a rather poor utilization of the switches. The present invention eliminates this problem as described in later section.

Figure 4A:
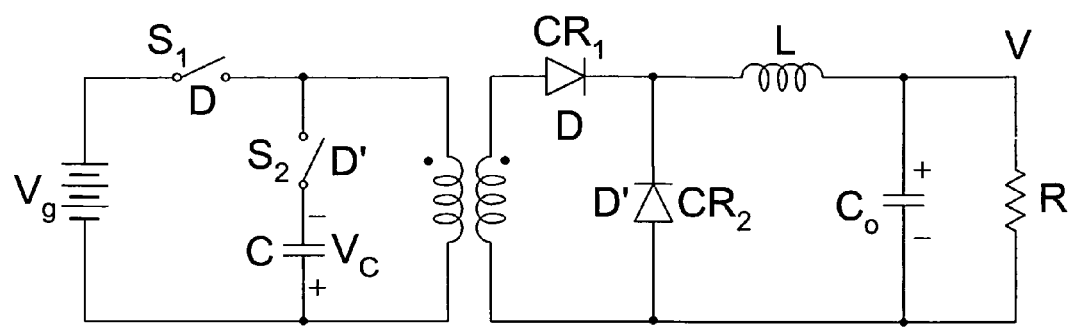
Figure 4B:
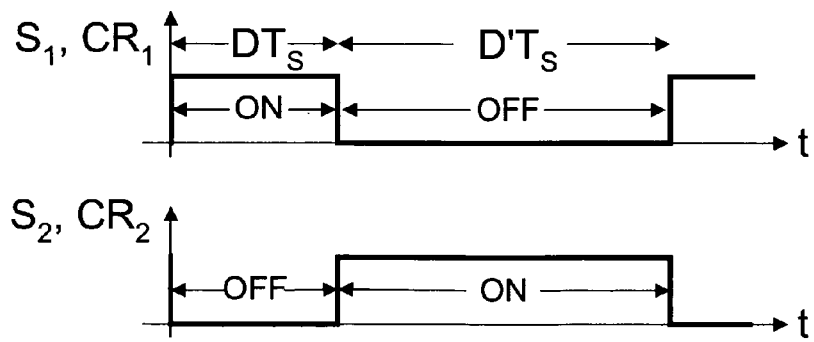

One of a number of isolated versions of the buck converters is a well-known forward converter, which is shown in FIG. 4a with its voltage clamp switch implementation for the isolation transformer reset. Isolated version allows additional voltage step-down or step-up of the input DC voltage based on its turns ratio n. The isolation is also required in many applications for safety reasons. In addition to the complementary switches S and S' on the primary side, forward converter of FIG. 4a also has two complementary current rectifiers (diodes) on the secondary side. Their states are controlled by states of the primary side switches so that in continuous conduction mode, all switch states are as in FIG. 4b. The DC conversion gain function is $(1/n)DV_g$.

One of the important characteristics of the switching converters is their switch utilization. Prior-art converters such as the two examples analyzed here are characterized by a rather poor switch utilization, which results in the needed power handling capability of the switches several times higher (such as three times or more) than the actual DC power processed. This clearly results simultaneously in efficiency reduction and increased cost.

The main cause for such poor switch utilization is excessive voltage stress of the switches. Let us find for each converter configuration the actual voltage stress of primary side switches relative to the input DC voltage $V_g$ and likewise, the actual voltage stress of the output switches relative to the output regulated DC voltage V, over full duty ratio operating range from 0 to 1. Voltage stress of secondary side switches is evaluated as:

$$V_{CR1}/V = 1/(1-D) \quad (2)$$

$$V_{CR2}/V = 1/D \quad (3)$$

Figure 5A:
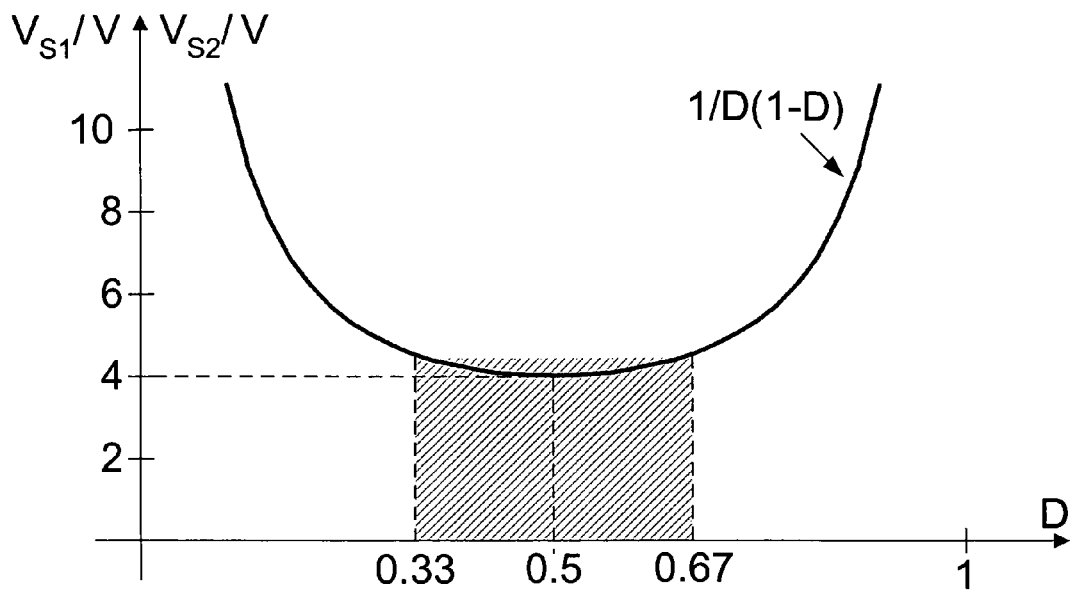
FIG. 5a shows the voltage stress change of primary side switches with shaded area as preferred operating range for the forward converter of FIG. 4a, and FIG. 5b shows the voltage stress change of secondary side switches for the forward converter of FIG. 4a with shaded area indicating a preferred lower voltage stress operating region.
Figure 5B:
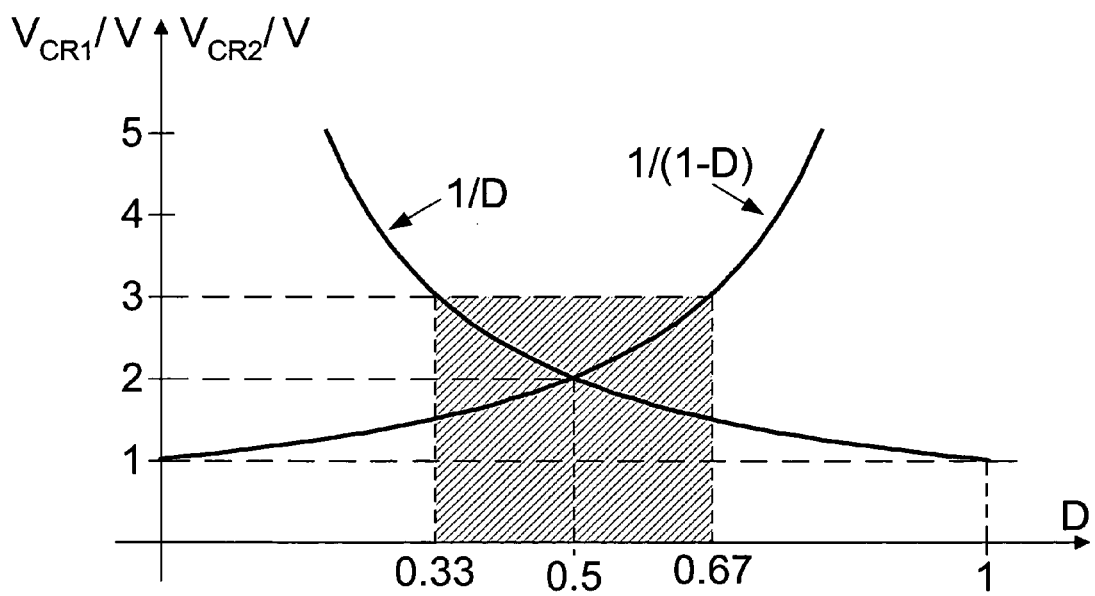

As evidenced by graphs in FIG. 5a and FIG. 5b, the operation in the region higher than 0.67 duty ratio is dangerous as three switches could "blow-out", that is, result in voltage stresses exceeding three times the respective input or output voltage. Likewise, operating at low duty ratios is also forbidden as the voltage stress on primary side switches will be excessive as per FIG. 5a. The operating range is then typically limited to 0.33 to 0.66 duty ratio range for a 2:1 input voltage range as marked by shaded area in FIG. 5a and FIG. 5b.

Prior-Art Asymmetric Half-Bridge Converter

Another prior-art PWM converter known as Asymmetric Half-Bridge (AHB) converter is shown in FIG. 6a and its DC gain characteristic $D(1-D)V_g$ in FIG. 6c. The voltage stresses of the switches on the primary side are limited to input DC voltage unlike those in forward converter. However, the output switches, behave in the same way as in forward converter as illustrated in FIG. 6b as they are described by the same equations (2) and (3). Actually, the voltage stresses on secondary side switches are even much worse, when the same input voltage range is needed as in forward converter of FIG. 4a. From the DC gain characteristic of FIG. 6c it is obvious that there would be very little change of DC gain (narrow 1.32:1 input voltage range) if the same operating region of 0.33 to 0.66 duty ratio as in forward converter is chosen, making it impractical. Therefore, to obtain the same 2:1 input voltage range the operating region in either low duty ratio or high duty ratio must be chosen. However, in these regions, either one or the other output rectifier switches experiences an excessive voltage stress many times that of the output voltage V resulting in poor utilization of the output switches even worse than in forward converter. This clearly points out how the choice of converter topology directly affects the voltage stresses of primary and secondary side switches. It also emphasizes the need for converter topology, which has much lower voltage stresses than existing converter topologies such as forward and AHB converters. The present invention also makes substantial improvements in the voltage stress reduction of switches on both primary and secondary sides.

SUMMARY OF THE INVENTION

Basic Operation
Non-Isolated Converter Topologies

Figure 7A:
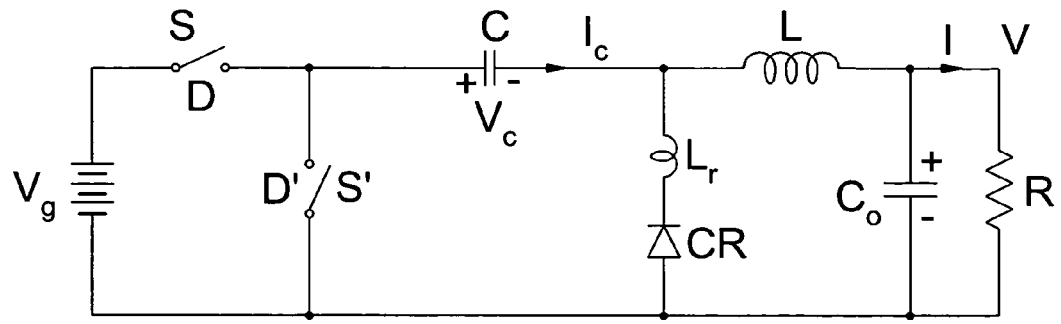
FIG. 7a illustrates the first non-isolated and non-inverting embodiment of the present invention.
Figure 7B:
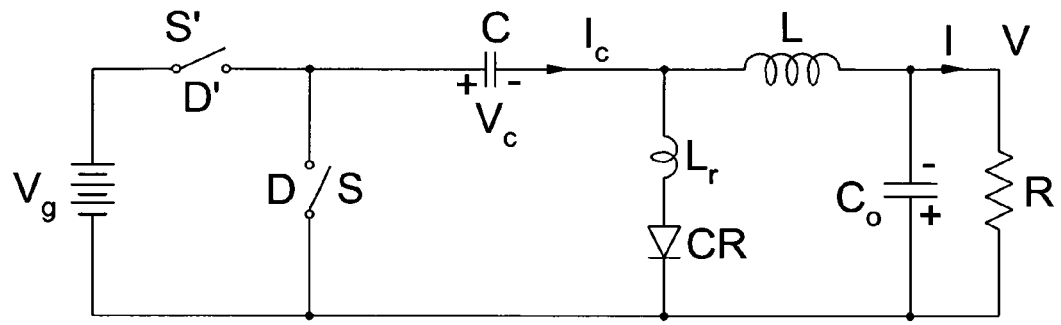
FIG. 7b illustrates the second non-isolated and polarity-inverting embodiment of the present invention.

The non-isolated version of the present invention has two basic variants: a non-inverting version shown in FIG. 7a and polarity inverting version shown in FIG. 7b. Both circuit feature a rather unorthodox configuration consisting of three switches contrary to the current official theory that switches ought to come in complementary pairs only. For example, all presently known switching converters have switches, which come in pairs thus having either 2, 4, or 6 switches that is an even number of switches.

Figure 7C:
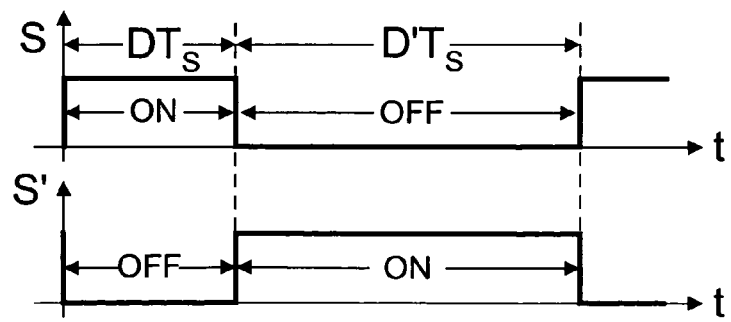
FIG. 7c illustrates the states of two controllable switches for the converters of FIG. 7a and FIG. 7b.

Two of the switches, marked S and S' in FIG. 7a, are controlling switches and operate out of phase as per switch state diagram illustrated in FIG. 7c. Furthermore, as the later analysis reveals, the active switch S' must be in its minimum realization a current bi-directional switch, such as MOSFET. They can be implemented as a three terminal active transistor switches such as MOSFET transistors illustrated in FIG. 8a and FIG. 8b. The third switch can be implemented in the simplest form as a passive two terminal current rectifier (CR) device (diode), which turns ON and OFF in response to particular circuit conditions dictated by both the controlling switches S and S' and the choice of the value of the resonant inductor $L_r$ and capacitor C as described in later section on detailed operation of the converters.

Isolated Converter Topologies

Figure 8A:
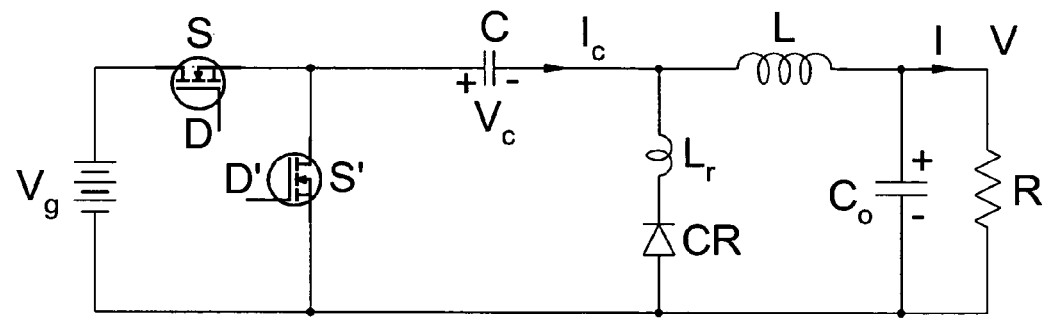
FIG. 8a illustrates implementation of MOSFET switches in the first non-isolated and non-inverting embodiment of the present invention of FIG. 7a, and FIG. 8b illustrates implementation of MOSFET switches in the second non-isolated and polarity-inverting embodiment of the present invention of FIG. 7b.
Figure 8B:
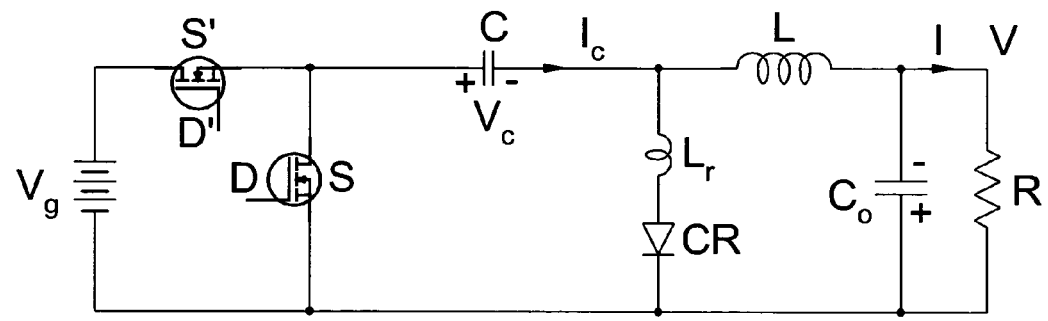
Figure 9A:
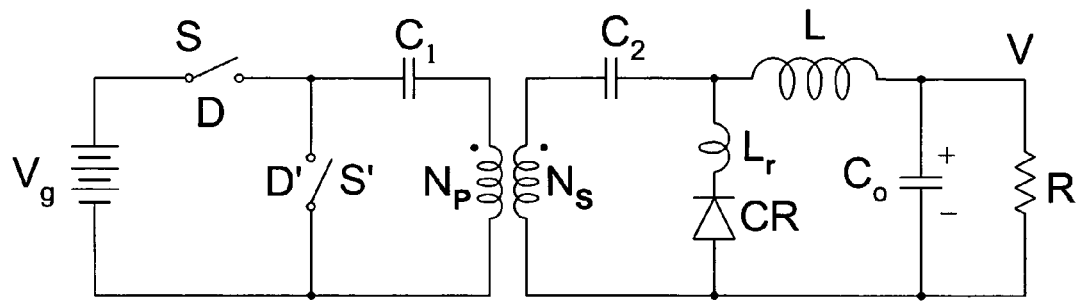
FIG. 9a illustrates the first isolated and non-inverting embodiment of the present invention and FIG. 9b illustrates the second isolated and polarity-inverting embodiment of the present invention.
Figure 9B:
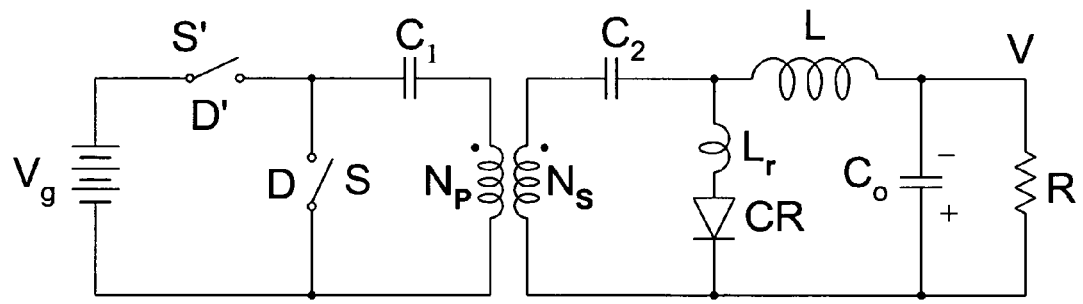
Figure 10A:
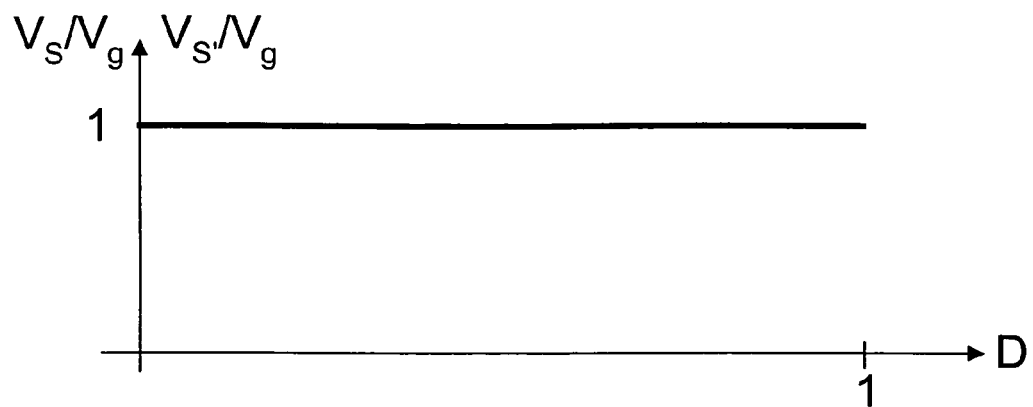
FIG. 10a shows that voltage stress on primary side switches of converters in FIG. 9a and FIG. 9b is constant and equal to the input voltage during whole and unlimited duty ratio range from 0 to 1.
Figure 10B:
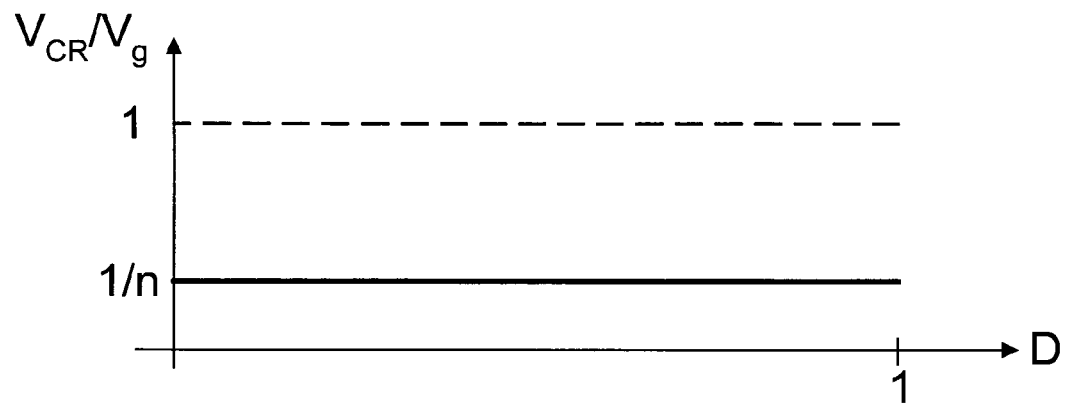
FIG. 10b shows that voltage stress on a secondary side switch of converters in FIG. 9a and FIG. 9b is constant during whole and unlimited operating duty ratio range from 0 to 1 and is equal to the input voltage divided by the turns ration of the isolation transformer.

By splitting the floating energy transfer capacitor C into two capacitors $C_1$ and $C_2$ and inserting an isolation transformer with $N_P$:$N_S$ primary to secondary turns ratio in each of the two converters of FIG. 8a and FIG. 8b, the respective galvanically isolated configurations are obtained as illustrated in FIG. 9a and FIG. 9b respectively. The voltage stresses on the switches are:

$$V_S/V_g = V_{S_1}/V_g = 1 \quad (4)$$

$$V_{CR}/V_g = 1/n \quad (5)$$

and are illustrated by graphs in FIG. 10a and FIG. 10b. Note that all three switches can be operated throughout the operating duty ratio D from 0 to 1 without a fear of any of the switches "blowing up": the input switches have the most desirable minimum voltage stress equal to the input DC voltage. The single output rectifier switch also has a low voltage stress equal to input DC voltage divided by the step-down turns ratio n.

As a direct benefit, a wide input voltage range is possible without any penalty on the circuit operation. This is in stark contrast to present converters, either square-wave type or resonant types, which operate within a very narrow input voltage range as illustrated by forward and AHB converters earlier. In present invention, a safe operation of the switches is always guaranteed not only during the steady state conditions, but also even during any transient conditions, such as start-up and shut down, short circuit conditions, or even any abnormal operating conditions. This clearly increases significantly not only efficiency but converter reliability too. Therefore, lower cost, lower conduction losses, and high efficiency can be achieved simultaneously.

The three-switch configuration of present invention has additional advantages. Note that the diode switch CR is ideally turned-ON at zero current at the beginning of the OFF interval, $D'T_S$ interval, and turned-OFF at zero current level at the end of the resonant interval $D_R T_S$ (FIG. 15c). As long as the OFF-time interval is long enough to allow the full discharge of energy transfer capacitor, the diode CR current reduces to zero and this diode is thus turned OFF under ideal zero current condition. This, in fact, eliminates the substantial turn OFF losses of conventional converters caused by long reverse recovery time and high reverse currents of diodes. Since inductor $L_r$ releases all its stored energy before the switch CR turns OFF, there are no turn-OFF losses of that switch. The single diode switch on the output therefore operates under the ideal conditions: zero voltage and zero current turn-ON and zero voltage, zero current turn-OFF. This is in stark contrast to the operation of all present converters, such as forward and AHB converters, for example, in which the two output switches do not operated under such preferable switching conditions and actually have a basic problem during both switching transitions: the output inductor current needs to commutate from one output rectifier switch to the other. Since it cannot be done instantaneously, the cross conduction occurs resulting in large current spikes during switching transitions requiring proper derating of the switches. This also results in unwanted high frequency noise.

Summary of the Advantages

The advantages of present invention can be therefore summarized as follows:
1. Step-down isolated converter, which provides high efficiency operation;
2. Polarity inverting configuration for non-isolated converter;
3. Voltage stresses of current rectifier on secondary side limited to input DC voltage divided by transformer step down turns ratio.
4. Voltage stress of the input switches limited to input DC voltage;
5. Wide input voltage range;
6. Isolation transformer makes possible additional voltage step-up or step-down based on transformer turns ratio n;
7. Small and efficient isolation transformer with no stored DC energy;
8. Integration of output inductor and isolation transformer leads to further performance improvements, such as very low output ripple voltage;
9. Constant OFF-time operation optimizes performance over wide input voltage range.

BACKGROUND OF THE INVENTION

Detailed Analysis of the Non-Isolated Step-Down Converter

Figure 10C:
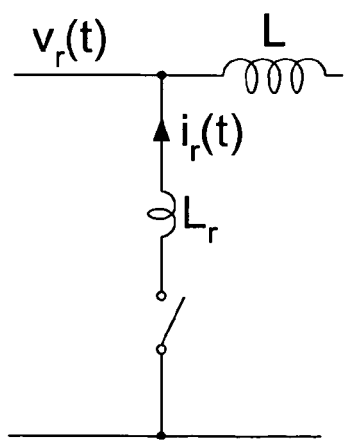
FIG. 10c shows a branch of converter comprising series connection of the switch and resonant inductor $L_r$, conducting resonant current $i_r(t)$.
Figure 10D:
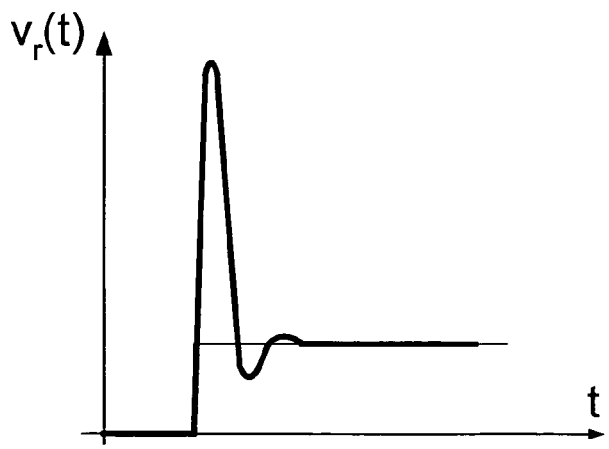
FIG. 10d illustrates a huge voltage spike generated across the switch when switch was open to interrupt the current flow of $i_r(t)$.

We now undertake the detailed analysis of the non-inverting converter of FIG. 7a with the objective to find DC conversion ratio and the salient waveforms of the converter, such as current in inductors and voltages on capacitors. In addition to the three switches, this converter also has an inductor $L_r$ connected in the branch with output diode CR. Conventional square-wave converters explicitly forbid such a placement of the inductor for apparently obvious reason: the inductor current cannot be interrupted as it will develop a huge voltage spike across inductor and result in large voltage exceeding rating of the switch and hence in its destruction as illustrated in FIG. 10c and FIG. 10d. The following detailed analysis will, however, show that the converter of the present invention operates in such a way that this placement of the inductor in switch branch is not only permissible, but actually crucial for the operation of the converter and its many advantages.

Hybrid Switched-Mode Power Conversion

Figure 11A:
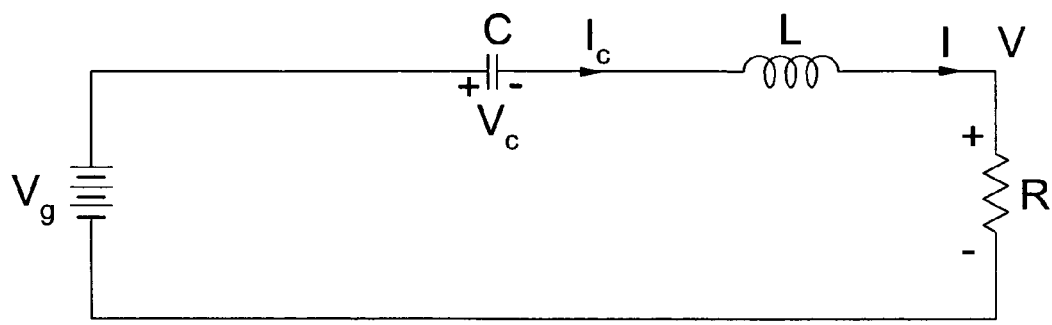
FIG. 11a shows a switching circuit of converter in FIG. 7a when switch S is closed (turned ON) and its complementary switch S' is open.

We assume a constant switching frequency of operation and duty ratio control D of the main switch S. First, we identify two linear switched networks: one for the ON-time interval $DT_S$ shown in FIG. 11a and the other for the OFF-time interval $D'T_S$ shown in FIG. 11b. Note that the large output filtering inductor L is subjected to the same square-wave voltage excitations as in standard square wave converters for both parts of the switching interval. However, the small resonant inductor $L_r$ forms a parallel resonant circuit with the energy transferring (and floating) capacitor C. Clearly this will lead to sinusoidal resonant current waveform of resonant inductor and co-sinusoidal resonant ripple voltage waveform of the capacitor C taking place during the OFF time interval D' $T_S$. It is apparent that this conversion method is different from conventional square-wave conversion method in which switch voltages and currents are all square-wave-like. It is also different from classical resonant converters in which both switch voltages and switch currents are all sinusoidal like for both switching intervals. Therefore, this conversion method is appropriately termed a hybrid switched-mode power conversion due to its unique combination of the two different conversion methods and their respective waveforms. The two switching intervals are also appropriately named square-wave interval for ON time interval and resonant for OFF time interval.

DC Analysis of Non-inverting Converter

Figure 12A:
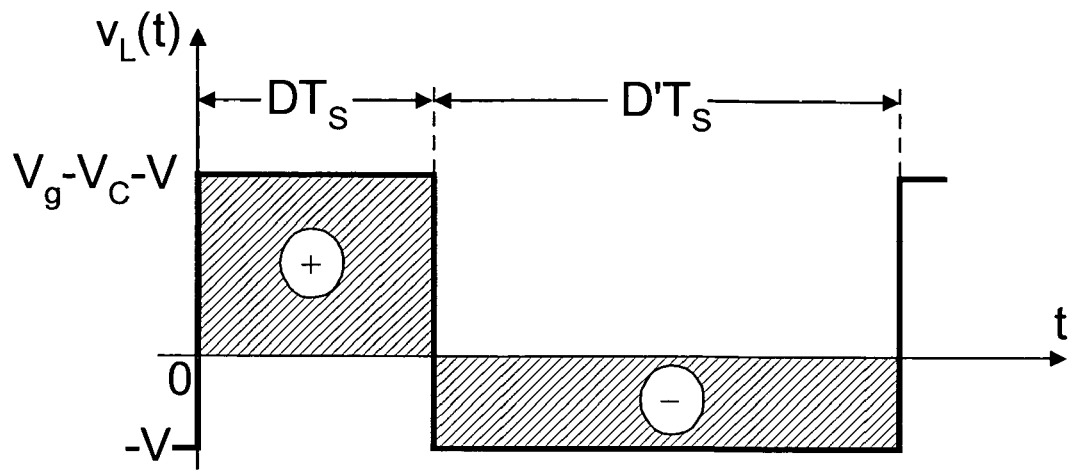
FIG. 12a shows a voltage waveform across inductor L during switching circuits shown in FIG. 11a and FIG. 11b.

To find the steady-state properties such as DC voltages on capacitors and DC currents through inductors as a function off the operating duty ratio D we can in this rather simple case employ the volt-second balance on main inductor L as shown in FIG. 12a. Note that the square-wave voltage across big output inductor L is completely unaffected by the presence of the small resonant inductor $L_r$. Thus we get:

$$D(V_g - V_C - V) = (1-D)V \quad (6)$$

Figure 12B:
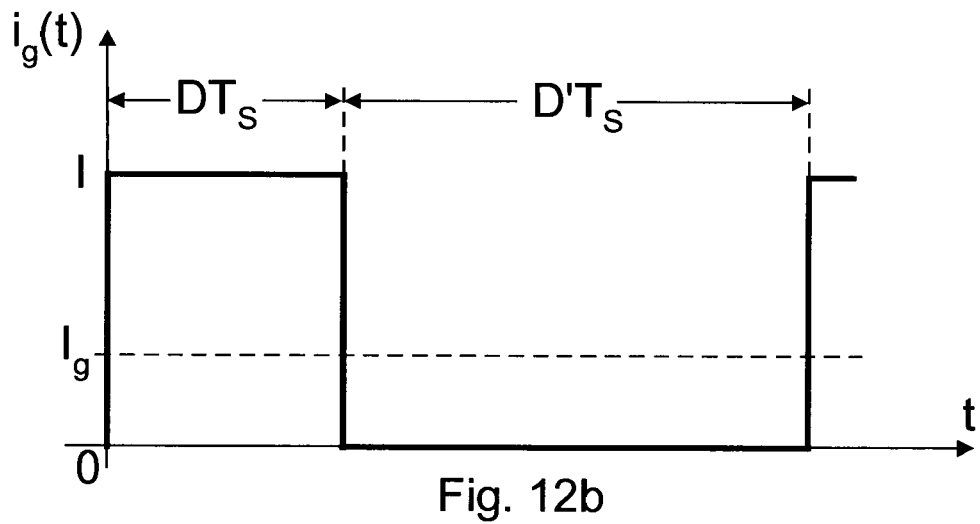

From input current waveform shown in FIG. 12b, the average input current $I_g$ is also completely unaffected by the presence of the resonant inductor $L_r$, as the current drawn from the source is equal to load current I during ON-time interval. Thus, $$I_g = DI \tag{7}$$

Figure 11B:
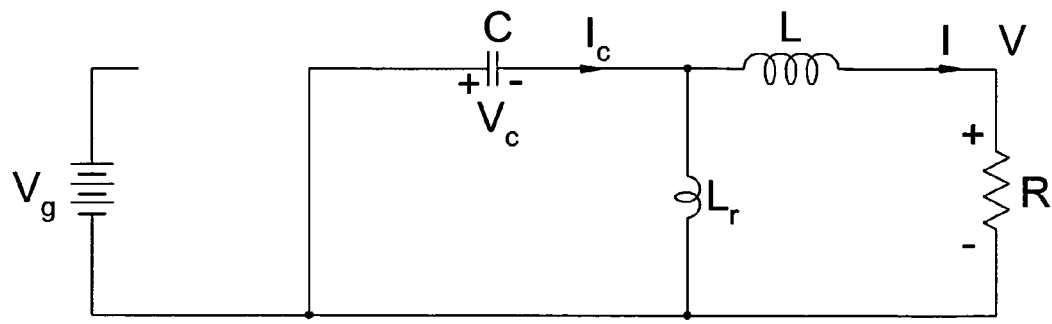
FIG. 11b shows a switching circuit of converter in FIG. 7a when switch S is open and its complementary switch S' is closed.

Finally, the resonant exchange of the energy between capacitor C and resonant inductor $L_r$ during OFF-time interval as per FIG. 11b is lossless. Thus, we can invoke a 100% efficiency argument to obtain additional equation:

$$V_g I_g = VI \tag{8}$$

From (6), (7), and (8) we can solve for output DC voltage V and DC voltage $V_c$ of capacitor C:

$$V = DV_g \tag{9}$$

$$V_C = 0 \tag{10}$$

Figure 12C:
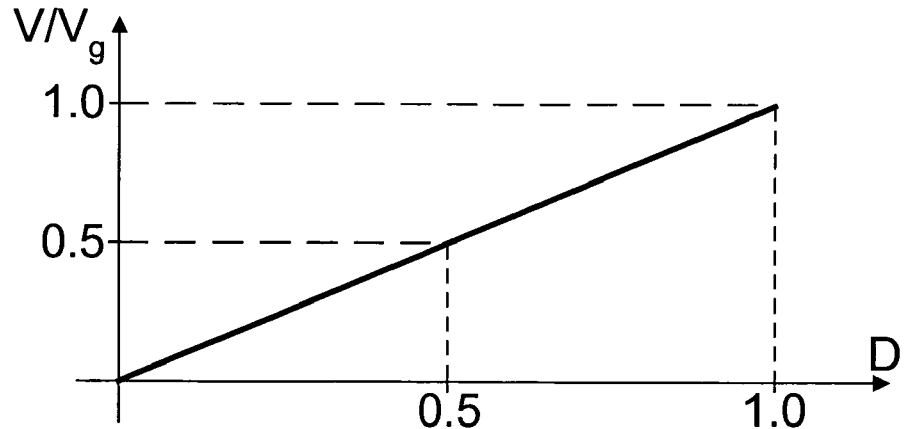

A rather interesting result is obtained: steady-state DC voltage $V_c$ of capacitor C is always zero for any duty ratio D. Furthermore, the DC conversion gain is the linear function of duty ratio as illustrated by equation (9) and graph in FIG. 12c.

To complete the waveform analysis one needs to solve the resonant circuit formed by capacitor C and resonant inductor $L_r$ during OFF time interval. However, the solution is identical for the polarity-inverting converter of FIG. 7b, so we will defer the resonant solution for later section.

DC Analysis of Polarity-Inverting Converter

Figure 13A:
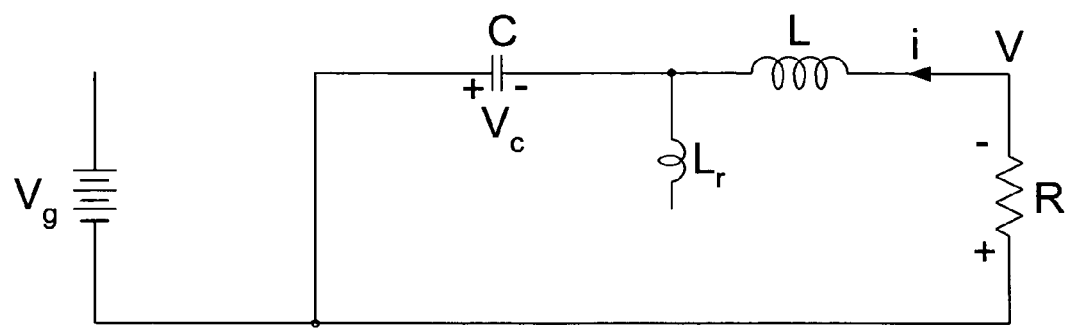
FIG. 13a shows a switching circuit of converter in FIG. 7b when switch S is closed and its complementary switch S' is open.
Figure 13B:
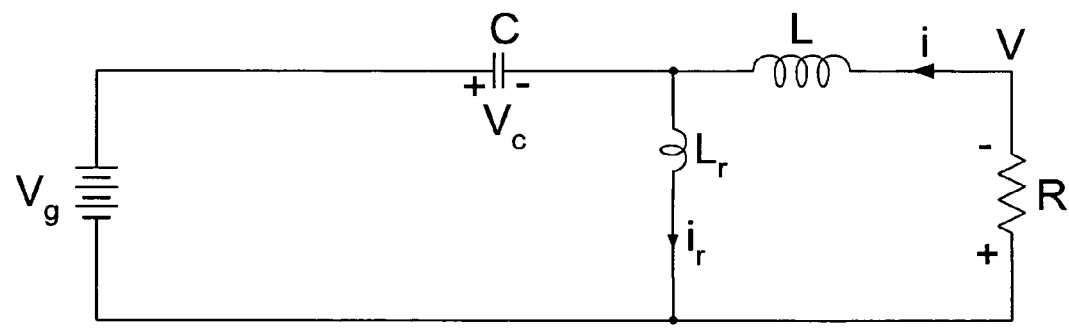
FIG. 13b shows a switching circuit of converter in FIG. 7b when switch S is open and its complementary switch S' is closed.

The two switched circuits, for square-wave interval and resonant interval for the polarity-inverting converter of FIG. 7b are shown in FIG. 13a and FIG. 13b respectively. Note that in this case, the input current is a resonant current $i_r$, which is sinusoidal-like and must be evaluated first if the 100% efficiency argument is to be used. Therefore, to find DC properties, the general method of analysis is used, the state-space averaging method described in details in Ref 1: Slobodan Cuk,"*Modelling and Analysis of Switching Converters*", Ph.D. thesis, Caltech 1976.

We now apply the state-space averaging method for both intervals and obtain the following equations:

Square-wave interval $DT_S$:

$$L\frac{di}{dt} = v_c - v \tag{11}$$

$$L_r\frac{di_r}{dt} = 0 \tag{12}$$

$$C\frac{dv_c}{dt} = -i \tag{13}$$

Resonant interval $D'T_S$:

$$L\frac{di}{dt} = -V_g + v_c - v \tag{14}$$

$$L_r\frac{di_r}{dt} = V_g - v_c \tag{15}$$

$$C\frac{dv_c}{dt} = i_r - i \tag{16}$$

Following state-space averaging method, we take the weighted average of the two sets of equations, with the weighting factors D and D' respectively to obtain the dynamic model which could be used to evaluate frequency response characteristics of this converter. For the special case of evaluation of DC quantities we equate the right hand side to zero. All time domain quantities become average DC quantities marked with corresponding capital letters so we get equations for steady state (DC):

$$V_C - V - D'V_g = 0 \tag{17}$$

$$D'(V_g - V_C) = 0 \tag{18}$$

$$-I + D'I_R = 0 \tag{19}$$

Solution is:

$$V = D'V_g \tag{20}$$

$$V_C = V_g \tag{21}$$

$$I = D'I_R \tag{22}$$

Once again the same linear DC conversion gain (20) is obtained as for non-inverting converter. The average input DC current is then given by:

$$I_g = D'(I_R - I) \tag{23}$$

Figure 14A:
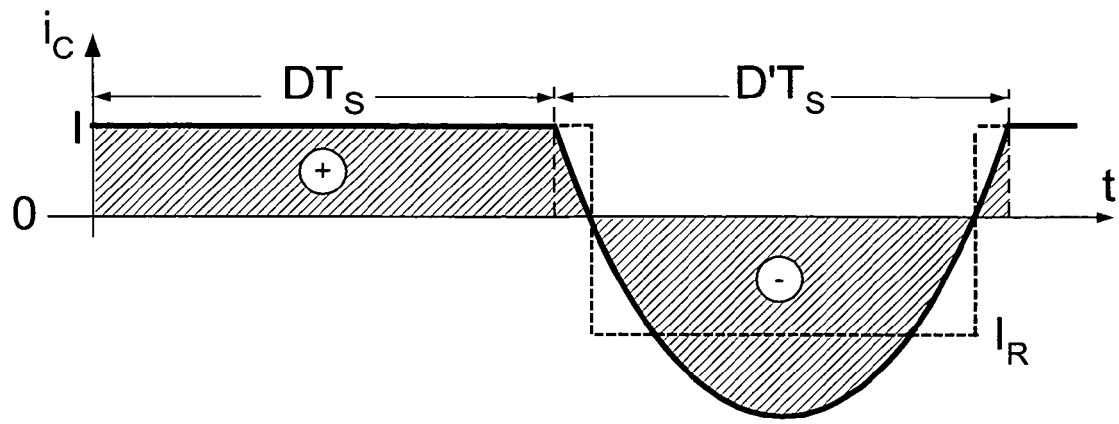
FIG. 14a shows the capacitor C current of the converter in FIG. 7a, FIG. 14b shows a switching circuit during switching interval when switch S' of the converter in FIG. 7b is closed.

Note that the state-space averaging is in the above description extended to handle even the resonant current waveforms, even though the original method was, obviously not considering those cases as the hybrid switched mode conversion did not exist. The above example illustrates with the help of FIG. 14a how this extension of the method is made. In above averaged equations we have introduced one quantity, which was not defined yet: the average resonant current $I_R$. FIG. 14a shows the capacitor C current $i_c$, which clearly shows square-wave like charging current and resonant, sinusoidal like discharging current. As the charging and discharging areas must be identical since no net DC charge over a single period is a prerequisite for a steady state (no increase of its DC voltage on cycle by cycle basis). Therefore, the area of the sinusoidal like discharge must be equal to an equivalent square-wave like current with magnitude $I_R$ as depicted in graph of FIG. 14a.

Hybrid Switched-Mode Conversion

Figure 14B:
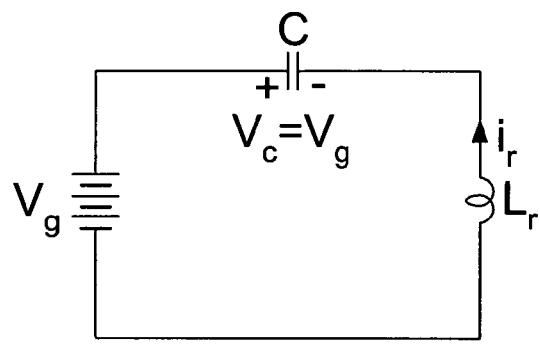
FIG. 14c is the circuit equivalent to that in FIG. 14b but with the DC voltages canceled to result in final resonant circuit.

Note that the voltage $V_c$ on capacitor C is no longer zero but equal to input DC voltage as shown by (21). This is significant, because the resonant circuit appears to be more complex as it consist of the series connection of capacitor C and input DC voltage source $V_g$ as shown in FIG. 14b.

However, because their DC voltages subtract exactly, the resonant circuit could be simplified to that of a single capacitor C, which now has an effective DC voltage $V_c$=0 and only operates with small ripple voltage on capacitor C. Therefore, the resonant circuit reduces to the same resonant circuit as for the non-inverting converter of FIG. 7a. This also illustrates one significant advantage of the hybrid switched-mode power conversion and a unique way the resonance is taking place in hybrid conversion. In true resonant converters the original square-wave voltage waveforms are distorted by resonance into sinusoidal waveforms with much larger peak values, resulting in much increased voltage stresses on switches. Here despite a large sinusoidal currents, the resonance does not effect to the first order the voltage stresses on the switches, as the resonance only effects the ripple voltage on capacitor C (changes them from linear to sinusoidal) thus, preserving original low voltage stresses on all switches.

Small Size of Resonant Inductor

Note also how this special hybrid switched-mode conversion results in very small size of resonant inductor. The AC voltage across resonant inductor is equal to a ripple voltage Δv across the capacitor C which is typically 20 times smaller then the sustaining DC voltage $V_c$:

$$\Delta v = 0.05 V_C \quad (24)$$

Therefore, the resonant inductor $L_r$ will be much smaller than the main output inductor L and also have correspondingly much less stored energy.

It is this ripple voltage Δv on capacitor C which is actually exciting the resonant circuit when the switch S' is turned ON during OFF time interval $D'T_S$. We are now in a position to complete the analysis by deriving the analytical expressions for the resonant current and resonant voltage during the resonant interval.

Analysis of the Resonant Circuit

Figure 15A:
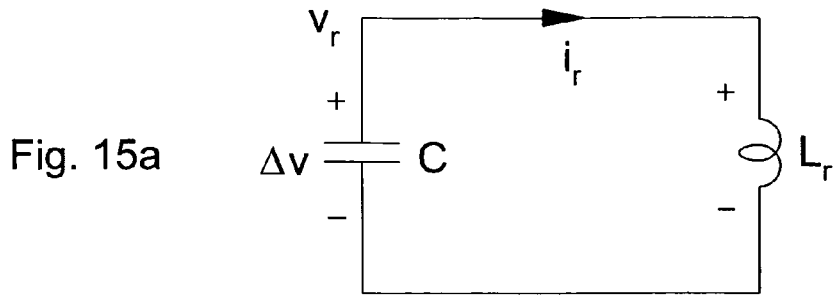
FIG. 15a shows a parallel resonant circuit during switching interval when switch S' of converter in FIG. 7a is closed.

We now analyze the resonant circuit shown in FIG. 15a. This second order resonant circuit can be described analytically by set of two cross-coupled first order differential equations described by:

$$C dv_r/dt = i_r \quad (25)$$

$$L_r di_r/dt = v_c \quad (26)$$

Figure 15B:
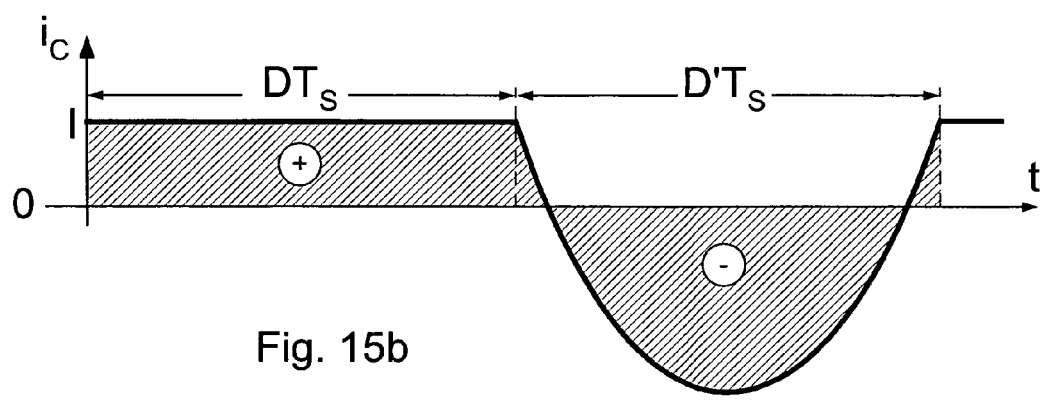
Figure 15C:
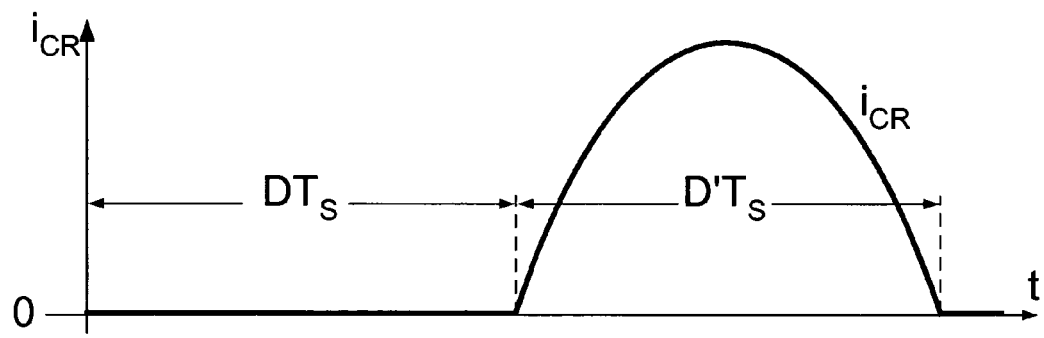
Figure 15D:
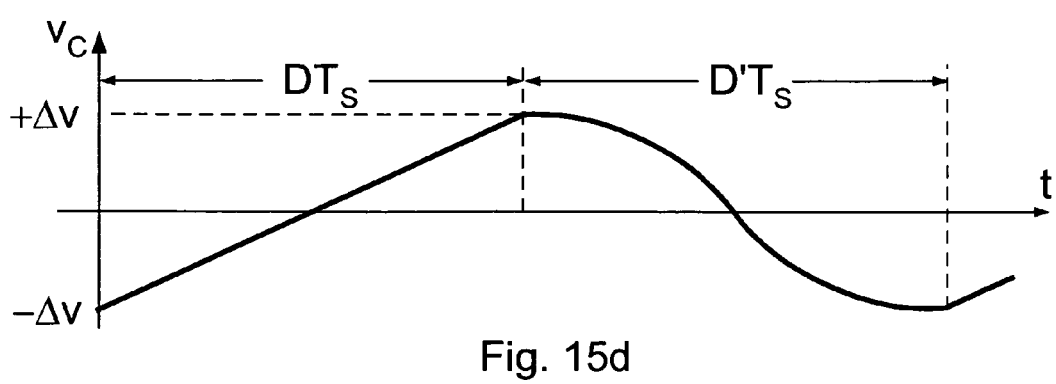

FIG. 15a shows that the capacitor C has a voltage Δv at the beginning of resonant interval. The capacitor C current is shown in FIG. 15b with shaded areas indicating equal positive and negative charge on capacitor C. FIG. 15c illustrates the diode rectifier current $i_{CR}$. As seen from FIG. 15d, the capacitor C was being charged during ON-time interval by a constant current source I leading to linearly rising ripple voltage, which at the end of ON-time is Δv. As resonant inductor was not conducting during ON-time interval, initial resonant current is zero and initial conditions are:

$$v_r(0) = \Delta v \quad (27)$$

$$i_r(0) = 0 \quad (28)$$

Solving (25) and (26) subject to initial conditions (27) and (28) results in the solution given by:

$$i_r(t) = I_P \sin(\omega_r t) \quad (29)$$

$$v_r(t) = \Delta v \cos(\omega_r t) \quad (30)$$

$$\Delta v = I_P R_N \quad (31)$$

$$R_N = \sqrt{\frac{L_r}{C}} \quad (32)$$

where $R_N$ is the natural damping resistance and $$\omega_r = \frac{1}{\sqrt{L_r C}} \quad (33)$$

and $$f_r = \omega_r / 2\pi \quad (34)$$

and $$T_R = 1/f_r \quad (35)$$

where $f_r$ is the resonant frequency and $T_R$ is the resonant period.

The initial voltage Δv at the beginning of resonant interval can be calculated from input inductor current $I_L$ during $DT_S$ interval in FIG. 11b as:

$$\Delta v = \frac{1}{2} \frac{I_L D'}{C f_S} \quad (36)$$

Substitution of (31) and (32) into (36) results in $$I_P = ID'\pi f_r/f_s \quad (37)$$

For simplicity, and without loss of generality, we assumed that the output inductor L is so large that its current can be represented by a constant current source I.

The capacitor current $i_c$ during resonant interval is then described by:

$$i_c = I - I_P \sin(\omega_r t) \quad (38)$$

and shown graphically as in FIG. 15b. Note once again that the two areas are shown shaded to emphasize their equal areas, as the net charge on capacitor over full cycle is zero under steady state conditions. Note also that FIG. 15b shows a special case when the resonant interval is equal to OFF-time interval, so that the diode current returns to zero just at the end of switching cycle. Clearly, when diode current reaches zero current level it will turn OFF. There is apparently no problem in voltage overshoot on resonant inductor at the turn-OFF instant since the current is zero. Thus, this justifies the premise made at the beginning that the resonant inductor in the switch branch is allowed and will cause no problems.

Figure 16A:
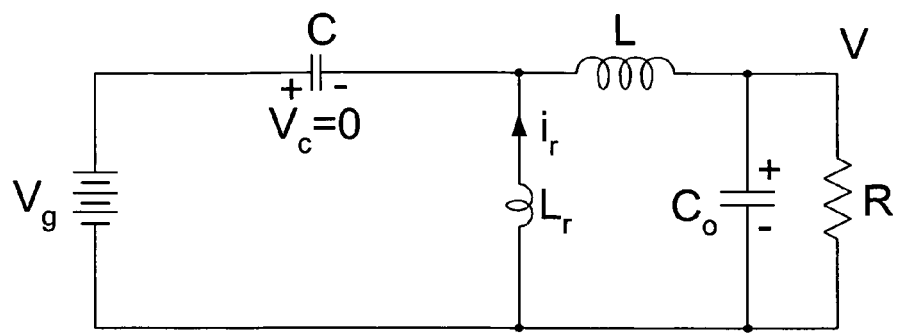
FIG. 16a shows a switching circuit during switching interval when switch S' of converter in FIG. 7a is open before the resonant current $i_r$ was reduced to zero.
Figure 16B:
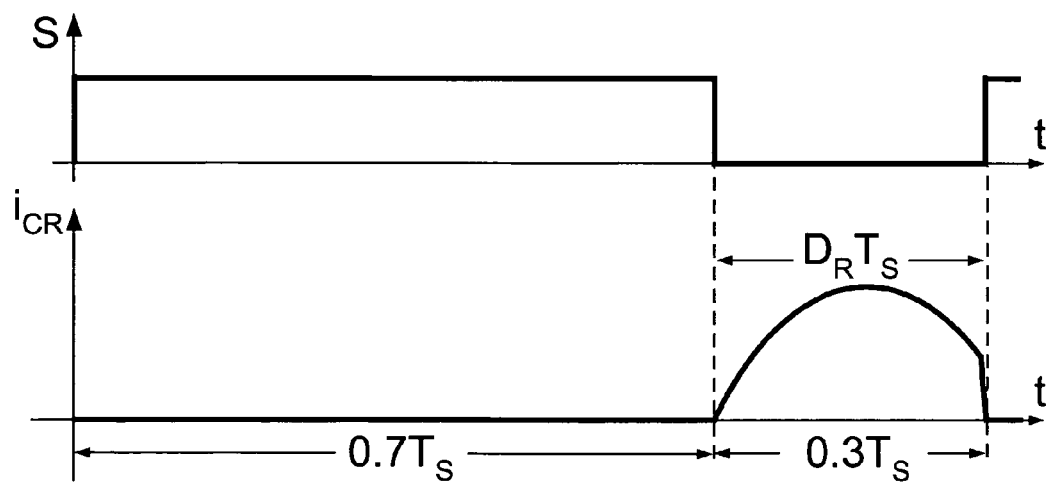

However, what about the case when there is indeed the finite non-zero current in the diode branch at the moment of turn-OFF of switch S'. In that case, the turning OFF of switch S' will NOT turn-OFF the current in the diode and the diode current will continue to flow because the circuit in FIG. 16a is obtained with switch S turned ON. For the converter of FIG. 16a a large DC voltage $V_g$ directly across the resonant inductor would result in a fast discharge of the current remaining in resonant inductor to zero with a slope of $V_g/L_r$ as illustrated in FIG. 16b. Clearly once zero current is reached, the current rectifier will turn-OFF. This now fully explains why the placement of the resonant inductor in diode branch is allowed under all operating conditions in the converters of present invention operating with hybrid switched-mode conversion. This is clearly not allowed in either square-wave or conventional resonant converters.

The condition encountered in the above case is when:

$$D_R > 1 - D \quad (39)$$

where $D_R$ is the resonant duty ratio.

We now look into several different methods by which the output voltage can be controlled and regulated.

Duty Ratio Control with Constant Switching Frequency

Figure 14C:
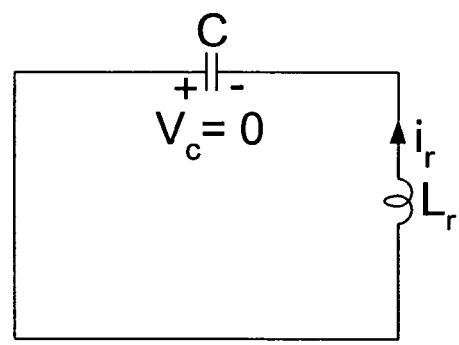
Figure 17A:
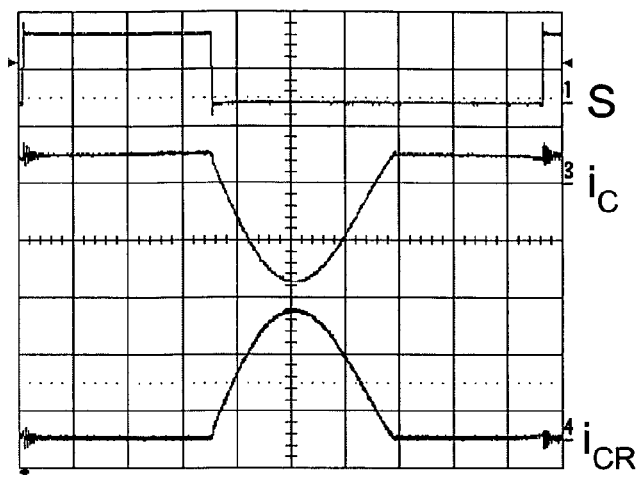
FIG. 17a shows the salient waveforms of the experimental prototype for the operation at duty ratio below 50%.
Figure 17B:
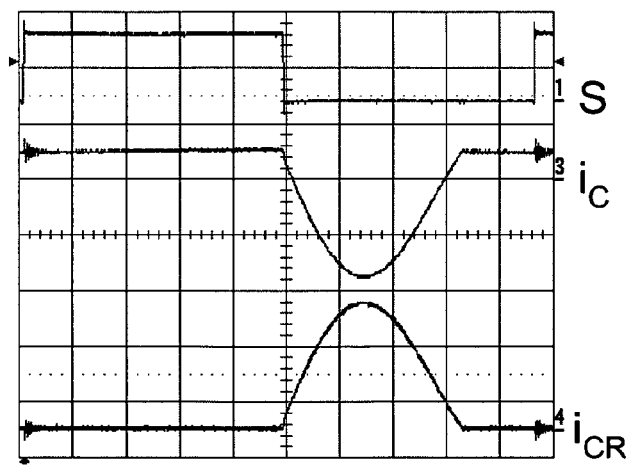
FIG. 17b illustrates the salient waveforms of the experimental prototype for the operation at duty ratio around 50%.
Figure 17C:
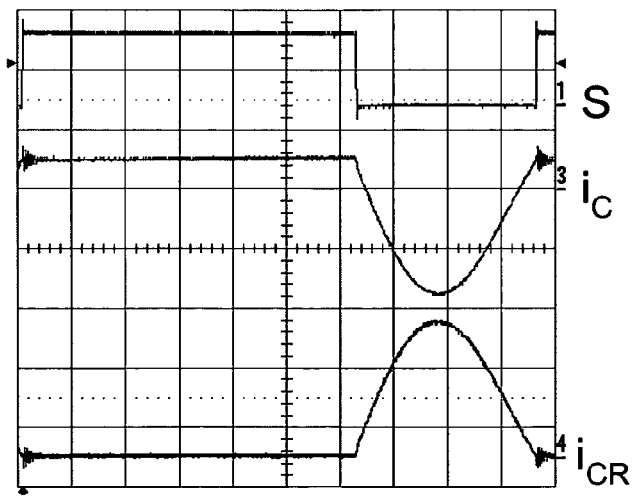
FIG. 17c illustrates the salient waveforms of the experimental prototype for the operation at duty ratio above 50% and for operation with constant switching frequency.
Figure 18A:
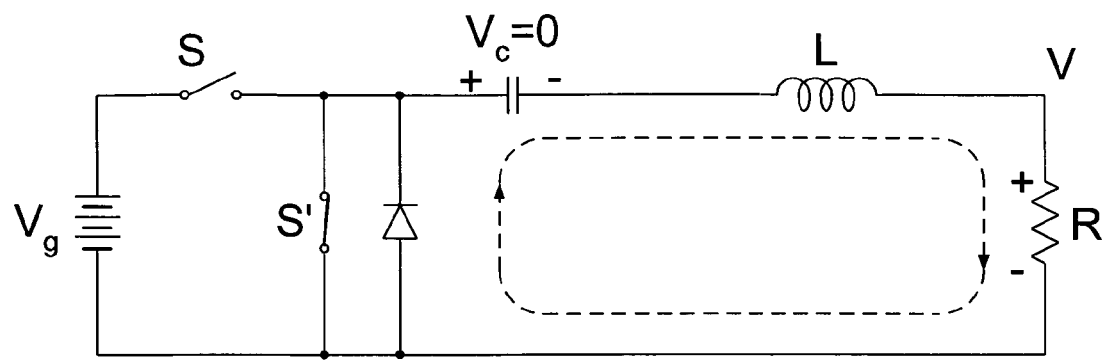
FIG. 18a shows the equivalent circuit of converter in FIG. 8a with constant switching frequency of operation and after the resonant current in diode rectifier is reduced to zero and diode is turned-OFF.
Figure 18B:
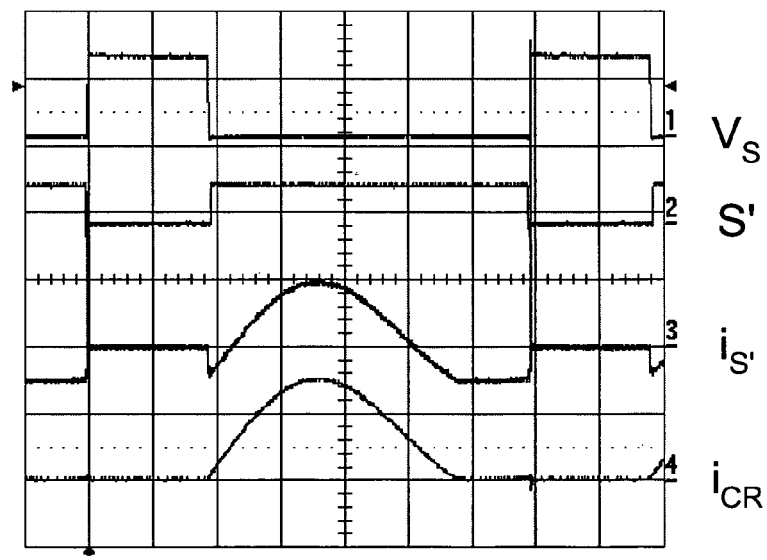
FIG. 18b shows the current in the bi-directional switch S' (middle trace) and the diode rectifier current (bottom trace) at duty ratio below 50%.
Figure 19A:
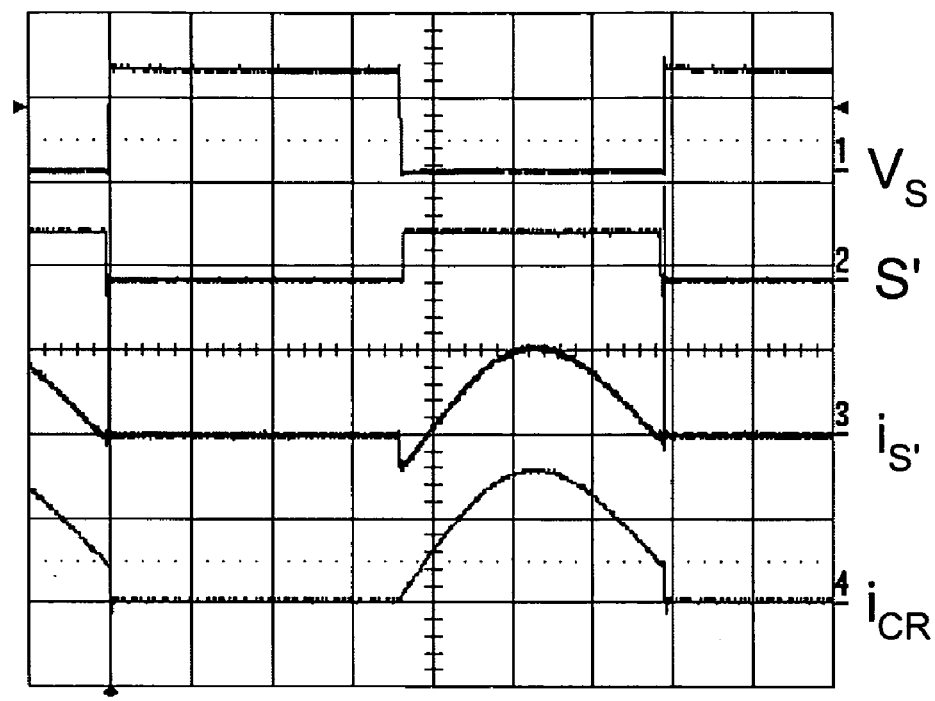
FIG. 19a shows the instant when switch S' current is zero at end of switching period salient waveforms of the of the experimental prototype at duty ratio around 50%.
Figure 19B:
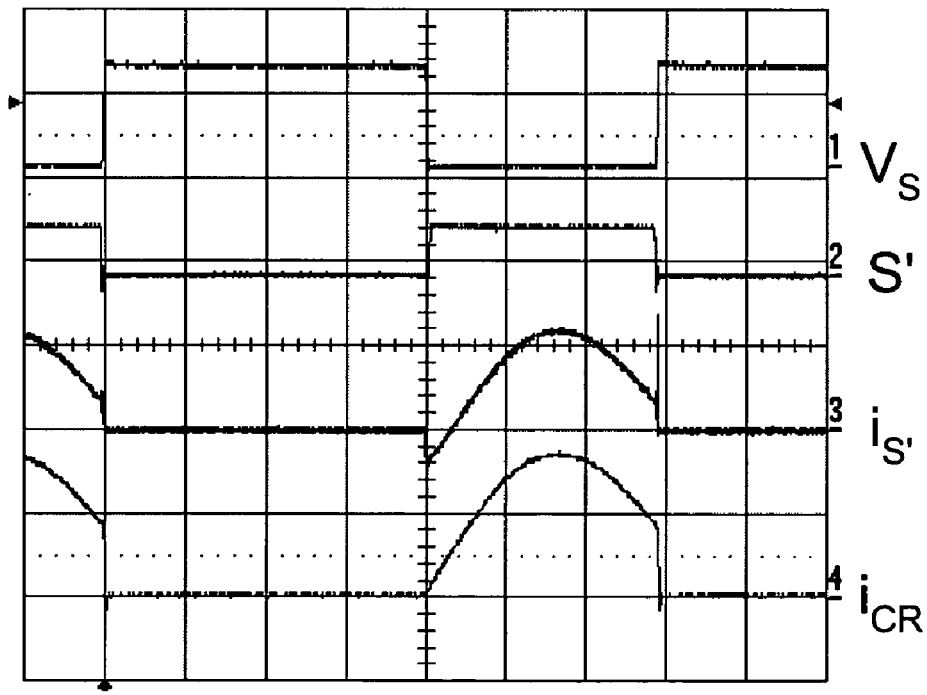
FIG. 19b shows the instant when currents in switch S' and diode rectifier are both positive

To investigate various modes of control a low power experimental converter was made operating under the following conditions: $V_g = 24V$, $I = 0.5 A$ First a constant switching frequency of $f_s = 20$ kHz is chosen. Also resonant components are chosen so that $D_R = 0.33$. The salient waveforms for three different operating points, D=0.33, D=0.5 and D=0.66 are shown in FIGS. 17a-c. The salient waveforms include from top to bottom: state of switch S, capacitor C current and diode CR current. The resulting output voltages are shown in Table 1 below, which confirms DC gain to be a linear function of duty ratio D. Note how the diode current is unchanged and only the beginning of resonant interval is moved with the increased duty ratio D. This seemed rather odd considering that increased duty ratio would result in more total charge on capacitor C, hence in higher total discharge and hence higher magnitude of the discharge current during the resonant interval which is fixed at $D_R$=0.33. However, the look at the circuit of FIG. 18a explains what is taking place. Although switch S is turned OFF and it appears that any further charge of capacitor C is prevented for the rest of the OFF-interval, this is not the case. Note that the switch S' is implemented as a current bi-directional switch having an anti-parallel diode, which is capable of conducting the current in opposite direction. Thus, when the resonant current flow stops, MOSFET switch S' is still able to conduct the load current which continues to charge capacitor C although not through switch S but instead through the body diode of switch S'. Second trace in FIG. 18b shows that S' switch is turned ON during entire $D'T_S$ interval, while the current through it changes direction. This is further confirmed by the current waveform of the switch S' which shows the capacitor C charging takes place even after diode CR current $i_{CR}$ is turned OFF as illustrated by the fourth trace in FIG. 18b. Thus, total charging interval is, in fact, constant and equal to 0.66 irrespective of the actual duty ratios D of 0.33, 0.5 or 0.66 as displayed in FIGS. 17a-c. Actually, the output inductor first circulates its current through the output diode CR and then after it stops conducting, it circulates its current through the body diode of the switch S'. By operating this switch as a synchronous rectifier one could reduce these additional conduction losses by using low ON-resistance of MOSFET to bypass conduction through its body diode. At some higher duty ratio the conditions are obtained as in FIG. 19a showing that switch S' can be also turned OFF at zero current with the reduced turn-OFF losses. In that case the load current is again conducted through the current rectifier CR. Finally, at yet higher duty ratio shown in FIG. 19b both switch S' and diode CR are turned OFF with the fast slope discharge as discussed before with reference to FIG. 14c. However, the better and more efficient way is to eliminate the conduction losses of switch S' after diode CR is turned OFF by implementing one of the two more efficient control and regulation methods described below which effectively eliminate this additional conduction interval.

TABLE 1

| Duty Ratio D | 0.36 | 0.5 | 0.65 | 0.715 |
|---|---|---|---|---|
| Output Voltage V [V] | 7.68 | 11.1 | 14.7 | 15.77 |

Duty Ratio Control with Constant OFF-Time

Figure 20A:
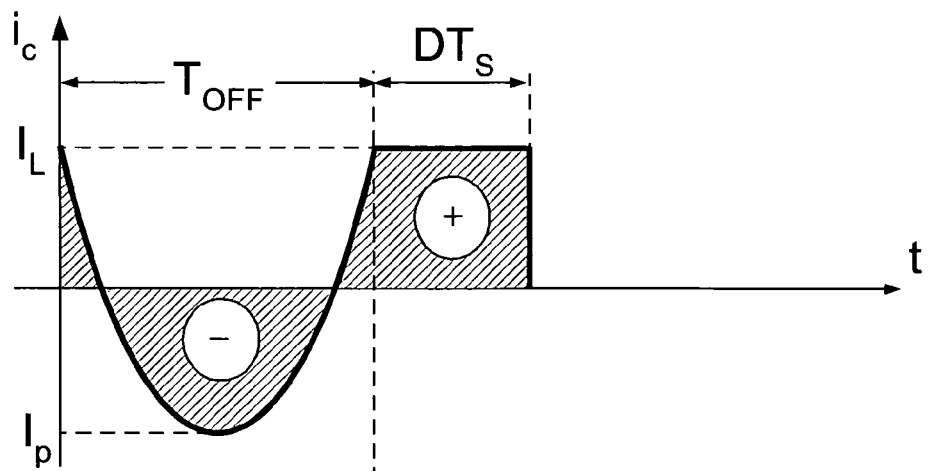
FIG. 20a shows a current waveform through capacitor C of converter in FIG. 7a, with constant $T_{OFF}$ time at high switching frequency.
Figure 20B:
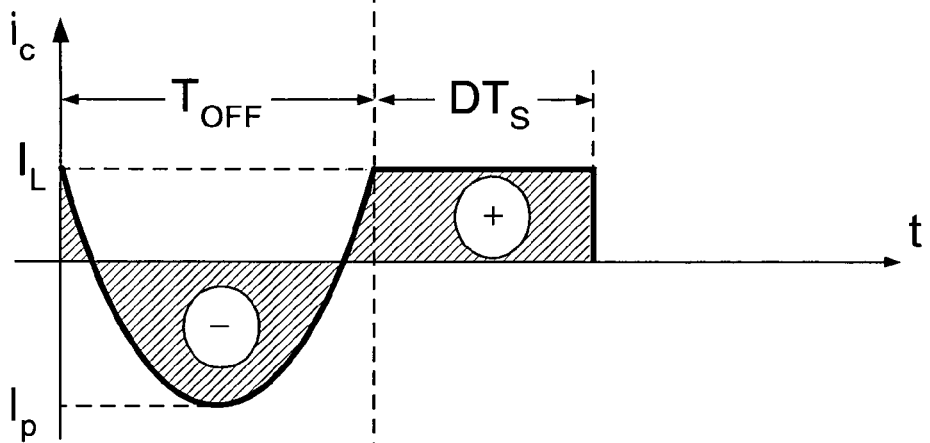
Figure 20C:
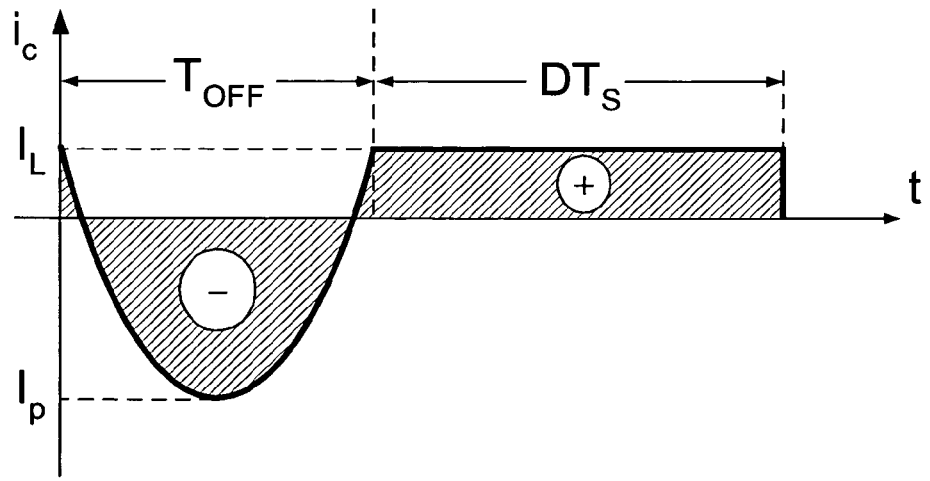

As the resonant interval $T_{OFF}=D_R T_S$ is constant and determined by the choice of the resonant components, it is quite natural to chose this OFF-time interval to be constant, and to exercise the control of output voltage by varying the ON-time interval $DT_s$ as illustrated in graphs of FIGS. 20a-c, for three duty ratios D=0.33, D=0.5 and D=0.66. Note that the OFF-time interval is displayed first, to emphasize the constant OFF-time, while the variable ON-time clearly results in corresponding variable switching frequency. Thus, we have both variable switching frequency and variable ON-time or equivalently variable duty ratio D as before. Note, however, that as in analysis of constant switching frequency converters with variable duty ratio, the steady-state conversion properties are still only a function of the duty ratio and do not depend on switching frequency. In fact, the same steady-state DC properties are maintained as derived in previous analysis for constant switching frequency of operation.

In this operation, the OFF-time is kept constant as per equation:

$$T_{OFF}=(1-D)T_S=T_r/2=\text{constant} \quad (40)$$

Hence, both duty ratio D and switching frequency must be variable in order to preserve relationship given by (40). Solving (40) for duty ratio results in:

$$D=1-f_S/2f_r \quad (41)$$

Thus, voltage regulation is obtained by use of the variable switching frequency $f_S$. However, this results in corresponding duty ratio D as per (41). Note that all DC quantities, such as DC voltages on capacitors and DC currents of inductors are still represented as a function of duty ratio D only, as in the case of conventional constant-switching frequency operation.

Figure 21A:
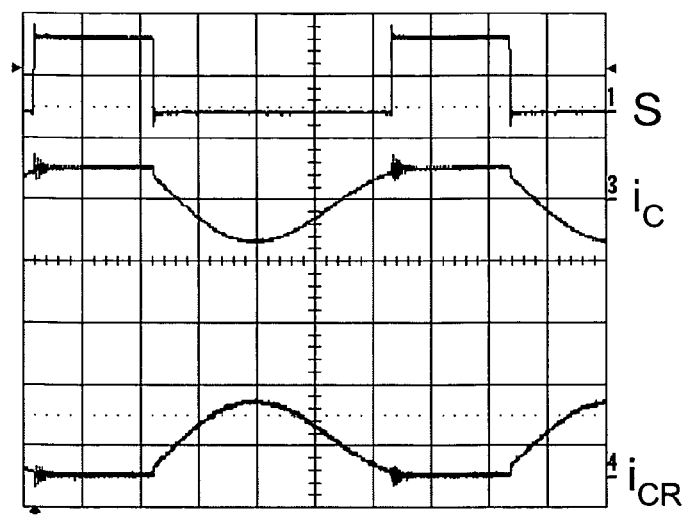
FIG. 21a shows the salient waveforms of the experimental prototype for the operation at duty ratio below 50%.
Figure 21B:
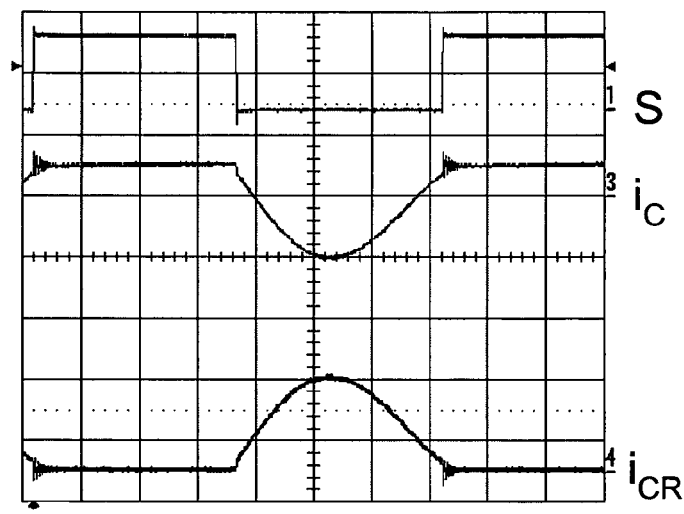
FIG. 21b illustrates the salient waveforms of the experimental prototype for the operation at duty ratio around 50%.
Figure 21C:
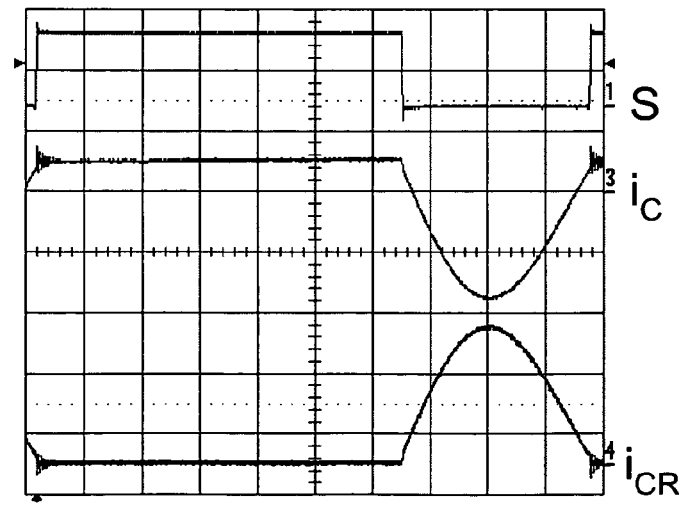
FIG. 21c illustrates the salient waveforms of the experimental prototype for the operation at duty ratio above 50% and all with the variable switching frequency operation.

The same experimental circuit is used now but with variable duty ratio and variable switching frequency to result in waveforms displayed in FIGS. 21a-c. The corresponding measured DC output voltages for three duty ratios and the corresponding variable switching frequencies are shown in the Table 2.

TABLE 2

| Switching frequency $f_S$ [kHz] | 21.0 | 27.5 | 32.0 |
|---|---|---|---|
| Output Voltage V [V] | 10.82 | 10.99 | 11.10 |

Note that despite the 2:1 change in duty ratio from 0.66 to 0.33, the corresponding switching frequency is increased approximately only 50% from 21 kHz to 32 kHz as per equation (41).

Resonant Circuit Analysis Under Constant OFF-Time Operation

The capacitor C current waveforms in FIG. 20a, FIG. 20b and FIG. 20c are shown for three different duty ratios and corresponding switching frequencies. Note that the resonant inductor current is the same as the capacitor C current during the $DT_S$ interval. Since capacitor C current must be charge balanced, the areas shown shaded must be equal in all three cases of different duty ratios. Clearly, this condition imposes a quantitative relationship between the peak value $I_P$ of the resonant current and load current I. Substitution of (22) into (17) results in:

$$I_P=(I\pi/2)(D'/D) \quad (42)$$

for all duty ratios in general. For a special case of 50% duty ratio:

$$I_P=I\pi/2 \quad (43)$$

This is illustrated by the capacitor current waveform in FIG. 20b. Note that this is the same relationship needed to insure that the two shaded areas in FIG. 20b are equal for a 50% duty ratio thus independently confirming the above general analysis. This also confirms an important practical result. The capacitor's rms current is only 11% higher than the rms value of the square-wave like current, which has minimum rms value.

Duty Ratio Control and Variable Resonant Interval

Figure 22A:
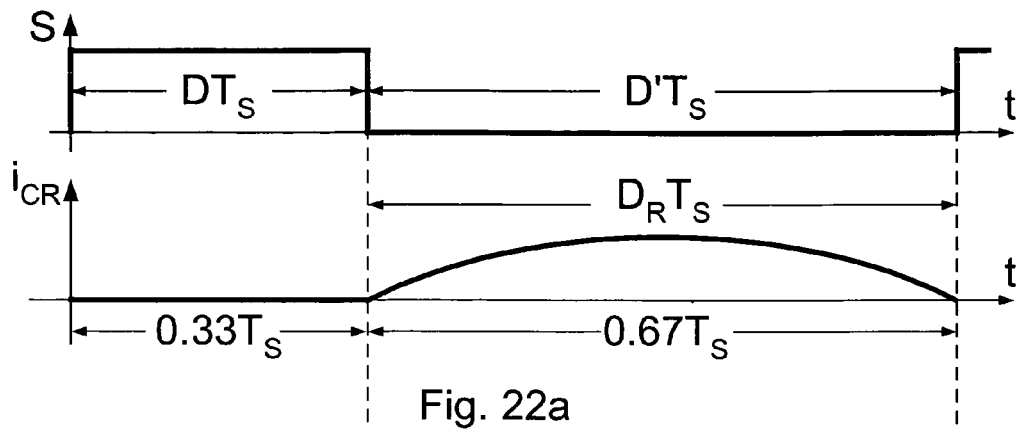
FIG. 22a illustrates a current waveform through the current rectifier CR of converter in FIG. 7a when duty ratio is D=0.33.
Figure 22B:
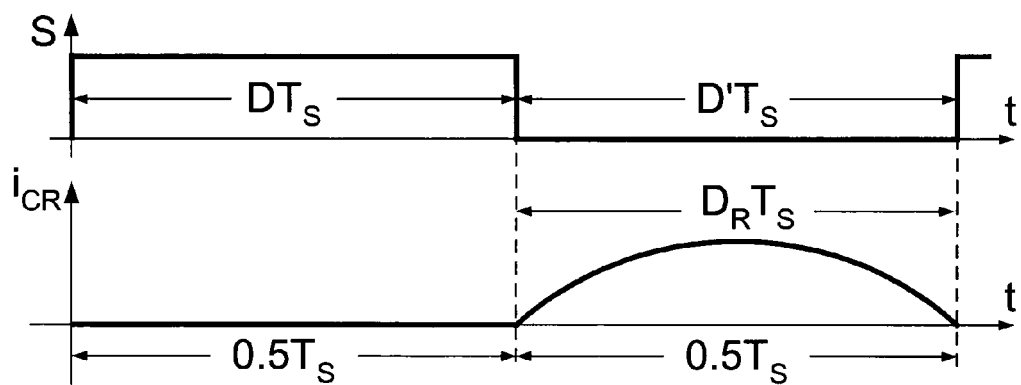
FIG. 22b illustrates a current waveform through the current rectifier CR of converter in FIG. 7a when duty ratio is D=0.5.
Figure 22C:
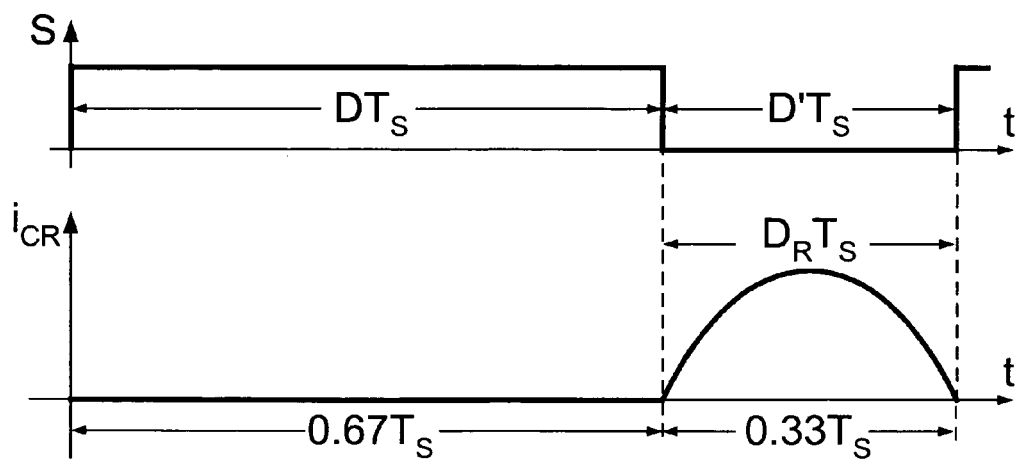
FIG. 22c illustrates a current waveform through the current rectifier CR of converter in FIG. 7a when duty ration is D=0.67, while the resonant current interval is adjusted accordingly to always equal to the OFF-time interval D'$T_S$.

The above ideal operation with diode current turning ON and OFF at zero current level and efficient operation is actually possible even when the switching frequency is kept constant. However, one must in that case adjust the resonant interval $D_R T_S$ to be always equal to the OFF-time, or alternatively to have for each duty ratio D corresponding matching complementary duty resonant duty ratio $D_R$ as displayed in FIGS. 22*a-c*: for D=0.33, $D_R$=0.66, for D=0.5, $D_R$=0.5, and for D=0.66, $D_R$=0.33 so that $$D_R=1-D \qquad (44)$$

This could be accomplished by changing for example, either the capacitor values or resonant inductor values. Although simply varying the air-gap could change resonant inductor values, this clearly mechanical approach would not work. However, there is an electronic alternative, which could be implemented using standard well-known means of varying inductor values by use of the saturable reactors. Then by varying the DC current of one winding one can directly change quickly the resonant inductor value and thereby change the respective resonant duty ratio $D_R$ to match the one needed by duty ratio D of the main switch to satisfy the boundary condition (40).

Stressless Switching

The best mode of operation is as shown in FIGS. 20*a-c* or FIGS. 22*a-c* when the resonant discharge interval (half of the resonant period) is equal to the OFF-time switching interval. In that case, in addition to lowest conduction losses, the current rectifier CR turns OFF under ideal conditions of zero current eliminating undesirable and large turn-OFF losses associated with the reverse recovery current losses which are especially prevalent in applications with higher output voltages.

The best mode of operation insured several distinct advantages:
1. Most efficient operation with minimum conduction losses is obtained;
2. The output current is switched under ideal conditions:
   a) Turn-ON of the current rectifier switch with zero voltage and zero current;
   b) Turn-OFF of the current rectifier switch with zero voltage and zero current eliminates turn OFF losses.

The absence of the complementary secondary side switch is very desirable as the cross conduction and spike problems present in conventional converters are eliminated naturally by the fundamental operation of the converter. Clearly, the single diode switch has no switching losses, neither turn-ON losses nor turn-OFF losses. Because of the ideal switching characteristics of the diode switch, which go well beyond just switching loss reduction of the prior-art converter, this method of elimination of switching losses and other undesirable stresses (spikes, etc) is appropriately termed stressless switching.

Figure 23A:
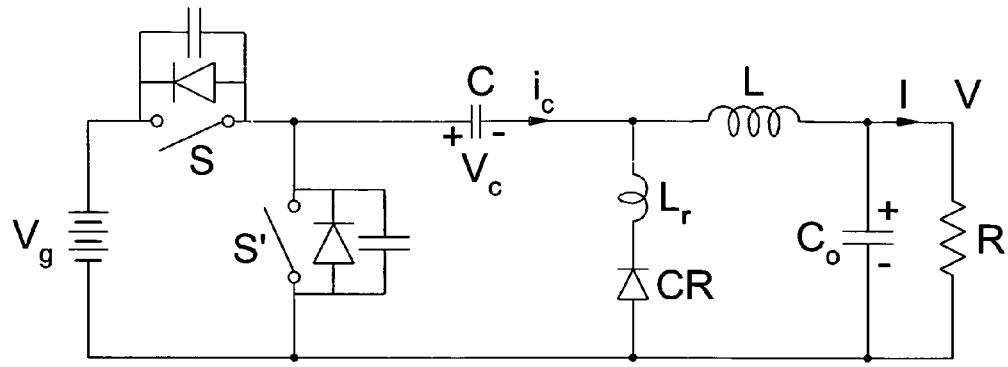
FIG. 23a illustrates the first non-isolated and non-inverting embodiment of the present invention of FIG. 8a in which MOSFET switches are replaced with a model of an ideal switch with parasitic capacitor and body diode connected in parallel.
Figure 23B:
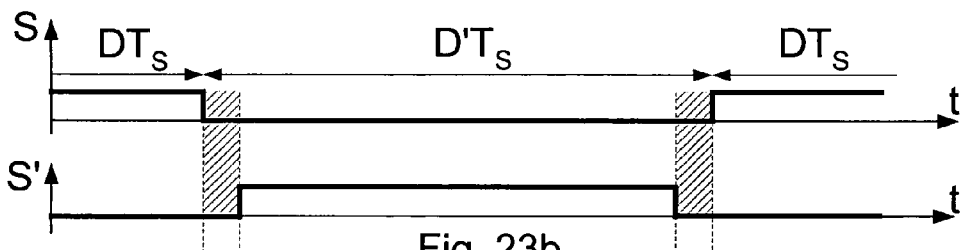
FIG. 23b illustrates state of the switches S and S' with two "dead time" intervals needed for a "stressless" switching.

With the switching losses and switching stresses completely eliminated from the current rectifier CR let us now see how we can also eliminate the switching losses from the two active switches S and S' which operate out of phase. For that purpose, the MOSFET switches of the converter in FIG. 8*a* are each modeled as shown in FIG. 23*a* with an ideal switch in parallel with the diode (simulating body diode of MOSFET) and a capacitor modeling the drain to source parasitic capacitance of each switch. The first step toward elimination of switching losses is to provide the two transition intervals $t_{N1}$ and $t_{N2}$ as designated in FIG. 23*d* during which both switches are turned-OFF as illustrated by their switch states in FIG. 23*b*.

The prior-art buck converter of FIG. 2*a* required a large ripple current (more than twice the DC load current) to effectuate the lossless exchange of the energy stored on the two parasitic capacitances of two MOSFET switches during the two transition intervals. This was necessary in order to generate a proper negative current (albeit very small) to perform energy exchange during the second forced transition.

Figure 23C:
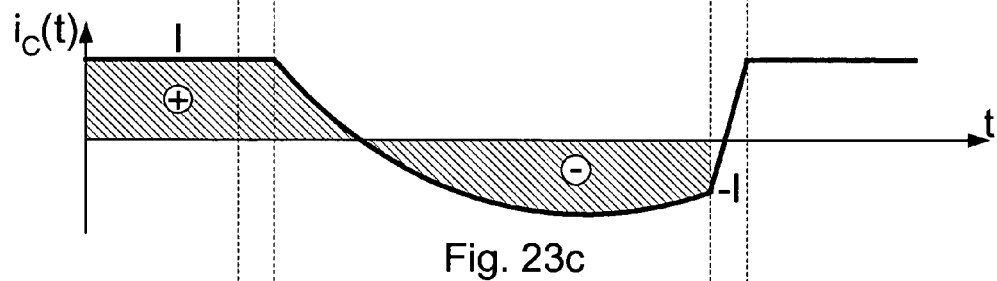
FIG. 23c illustrates a current waveform through capacitor C in FIG. 23a, and FIG. 23d illustrates voltage waveforms on switches S and S' in FIG. 23a with two natural transition intervals $t_{N1}$ and $t_{N2}$ uniquely present in the new stressless switching.
Figure 23D:
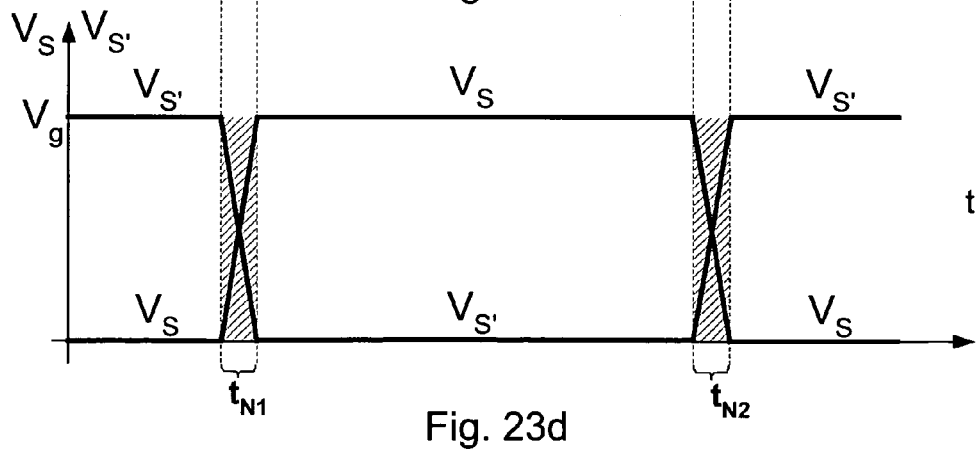

Note, however, that in the present invention no such conditions are needed or imposed on the output inductor, as such polarity-changing current is already available in the form of the capacitor C current illustrated in FIG. 23*c*. At the beginning of first transition the positive charging current of capacitor C is equal to DC load current I discharges the parasitic capacitor of S' switch causing also the linear reduction of its voltage to zero at which point its body diode turns ON the switch at zero switching losses (see FIG. 23*d*). The discharge energy is transferred to the parasitic capacitor of the switch S. After capacitor C has undergone discharge during resonant interval to the point that it now has a negative current equal to −I, by turning OFF the switch S' the opposite transfer of energy takes place between two parasitic capacitors during second transition. This time the parasitic capacitor of switch S is being discharged and its voltage reduced to zero at which point its body diode is turned ON thus turning the switch S at zero voltage with zero switching losses as in FIG. 23*d*.

Figure 24A:
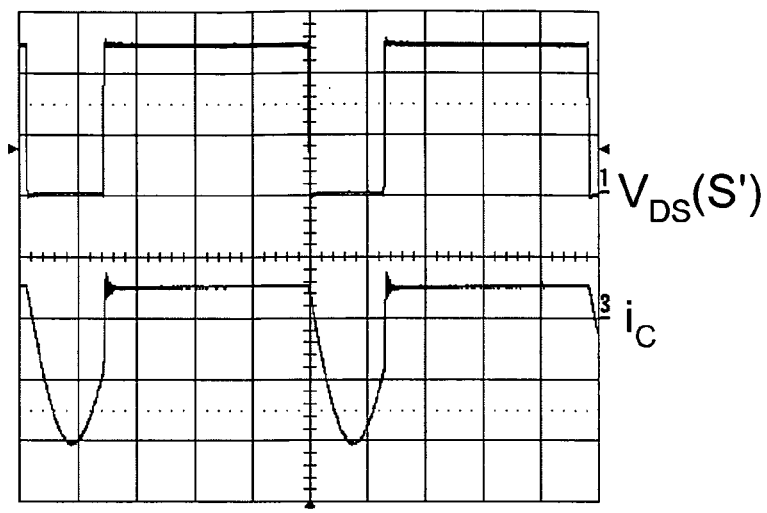
FIG. 24a illustrates the salient waveforms of the experimental prototype during stressless switching of switches S and S' in the converter of FIG. 8a at full load
Figure 24B:
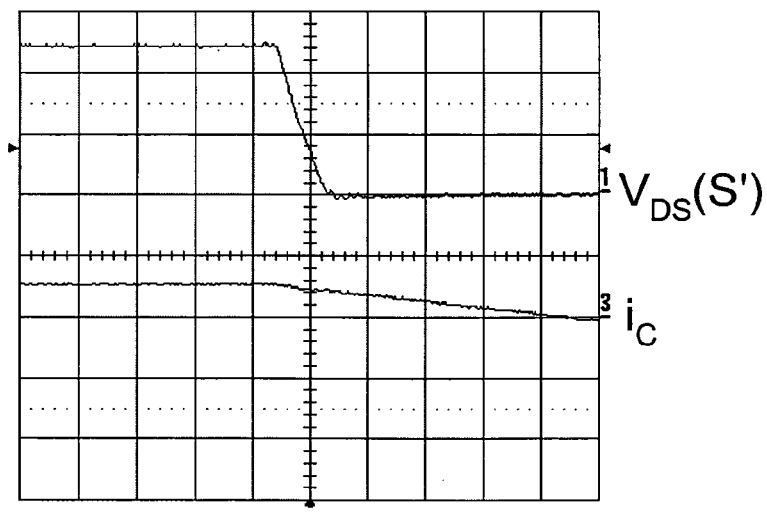
FIG. 24b illustrates waveforms of FIG. 24a during enlarged D to D' sressless switching transition.
Figure 24C:
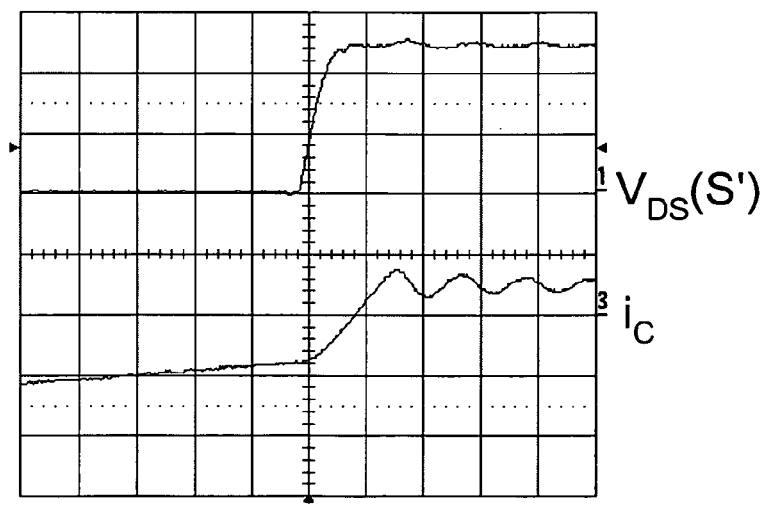
FIG. 24c illustrates waveforms of FIG. 24a during enlarged D' to D stressless switching transition.
Figure 25A:
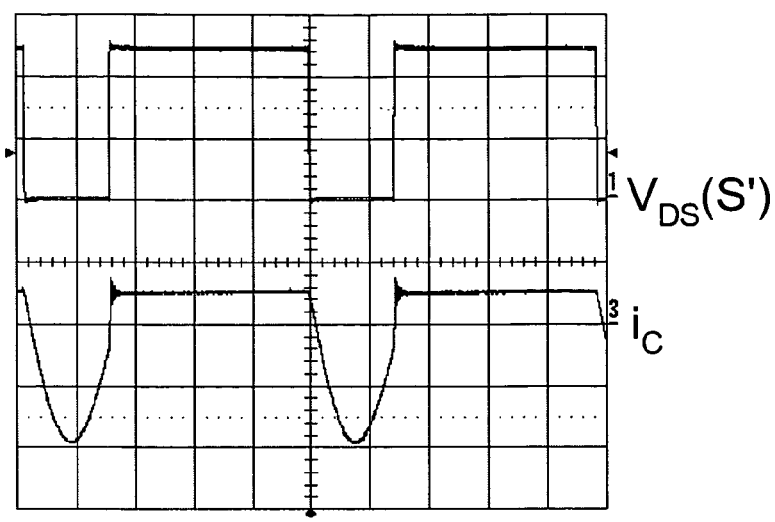
FIG. 25a illustrates the salient waveforms of the experimental prototype during stressless switching of switch S in converter of FIG. 23a at 50% load current condition.
Figure 25B:
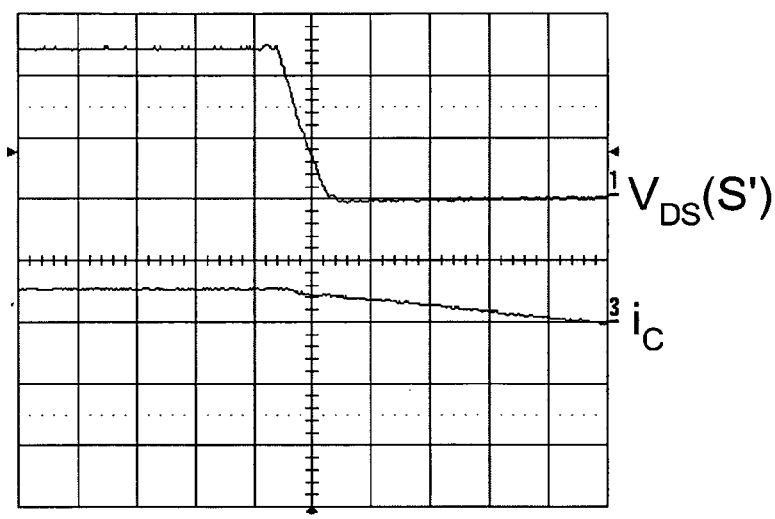
FIG. 25b illustrates waveforms of FIG. 25a during enlarged D to D' stressless switching transition.
Figure 25C:
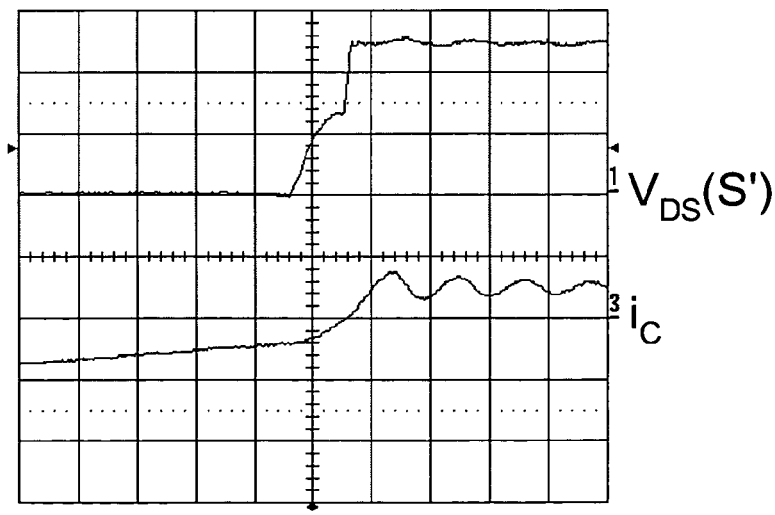
FIG. 25c illustrates waveforms of FIG. 25a during enlarged D' to D stressless switching transition.

The stressless switching of the two switches is confirmed experimentally on the same converter used to illustrate various control methods in previous sections. The experiment is conducted for full load current and at 50% load current. Top trace on FIG. 24*a* shows the drain to source voltage of the switch S', while the bottom trace shows the capacitor C current. The first transition (D to D') is shown enlarged on FIG. 24*b* and top trace confirms the linear discharge of the drain to source voltage of switch S' and zero voltage turn-ON. The second transition is shown enlarged on FIG. 24*c* displaying fast rise of the drain to source voltage of S' switch and its turn-OFF at peak voltage with no voltage overshoot. The parasitic capacitor of switch S is therefore discharging fast and turning ON at zero voltage. FIG. 25*a* reinforces the switching loss reduction at 50% load, except this time, the first transition has full discharge to zero voltage (FIG. 25*b*) while the second transition (FIG. 25*c*) that switch S has only partial lossles discharge and still some hard switching losses as the reverse current was not sufficient for full zero voltage switching.

Other Non-Isolated Embodiments

The two embodiments of present invention, shown in FIG. 7*a* and FIG. 7*b*, had the resonant inductor placed in the diode branch. However, the resonant inductor could be moved to the capacitor C branch as in FIG. 26*a* to create polarity non-inverting converter with essentially the same performance. For example moving the resonant inductor from the diode branch through the node connecting capacitor C and output inductor, the resonant inductor in capacitor branch would be generated. The added small resonant inductor in series with large output inductor would have only second order effect on the performance. The key is that the resonant circuit analysis would be the same as derived earlier. However, there is one added advantage of placing the resonant inductor in capacitor C branch. We have shown earlier that capacitor C must be charged balanced in the steady state, which means that it cannot pass any average or DC current over one cycle period. This in turn confirms that the resonant inductor when placed in this branch will have no DC boas and will be designed as an AC small value resonant inductor. This should be contrasted to the requirement for resonant inductor when in diode branch, where it must be designed considering that it has substantial DC bias, equal to DC load current. The above analysis applies equally well to the polarity-inverting configuration of FIG. 26*b*. Two other possible placements of the resonant inductor are also shown in FIG. 27*a* and FIG. 27*b* but with possibly inferior performance. Both are in the branch with main switch and their turn-OFF might cause large, but narrow spikes of the kind discussed with reference to FIG.

10c and FIG. 10d. Nevertheless as the energy stored in the resonant inductor is rather negligible (two order of magnitude below that stored in output inductor for example), a transorber could be used to limit the turn-OFF spike voltage. Each of the four converters in FIGS. 26a-b and FIGS. 27a-b have also their isolated equivalents analyzed in more details in next section.

Detailed Analysis of the Isolated Converters

Figure 26A:
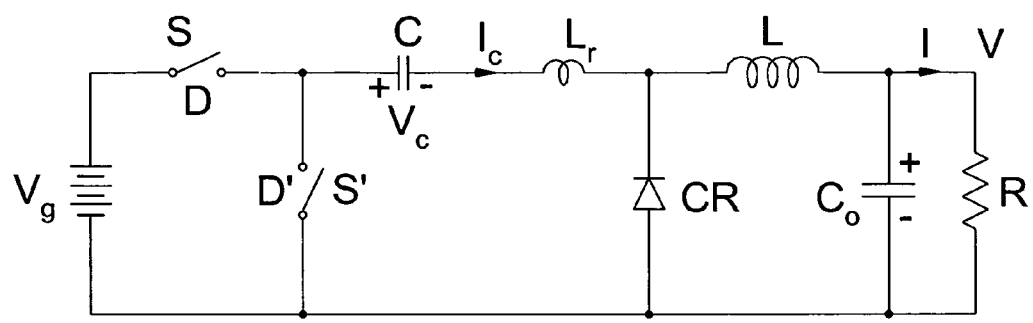
FIG. 26a illustrates another non-isolated and non-inverting embodiment of the present invention in which resonant inductor $L_r$ is in series with energy transfer capacitor C and FIG. 26b illustrates another non-isolated and polarity-inverting embodiment of the present invention in which resonant inductor $L_r$ is in series with energy transfer capacitor C.
Figure 26B:
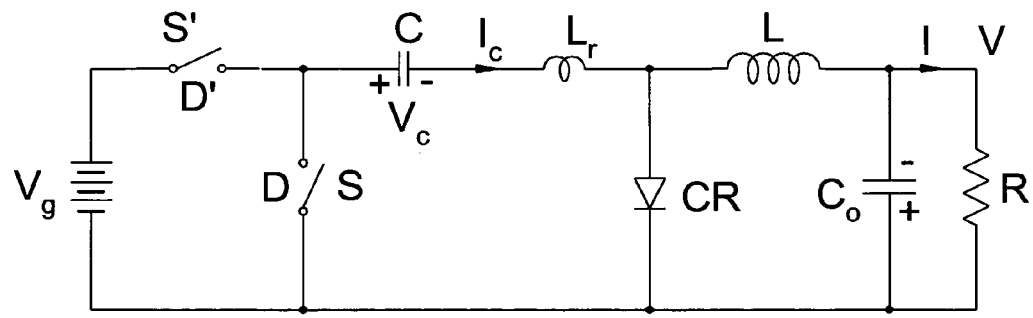
Figure 27A:
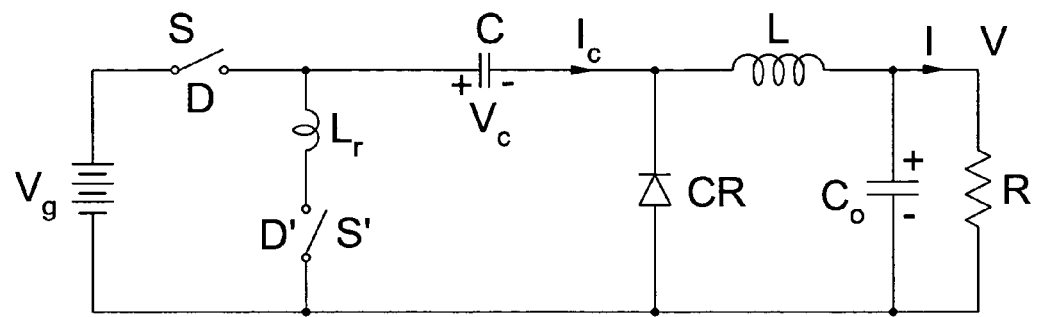
FIG. 27a illustrates another non-isolated and non-inverting embodiment of the present invention in which resonant inductor $L_r$ is in series with complementary switch S' and FIG. 27b illustrates another non-isolated and polarity-inverting embodiment of the present invention in which resonant inductor $L_r$ is in series with complementary switch S'.
Figure 27B:
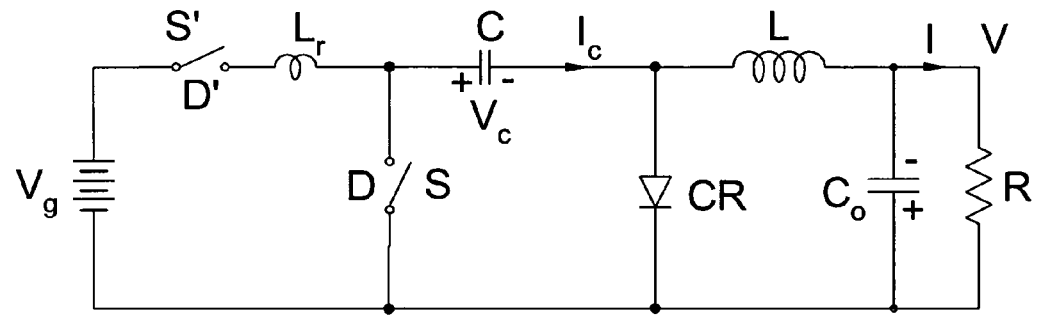
Figure 28A:
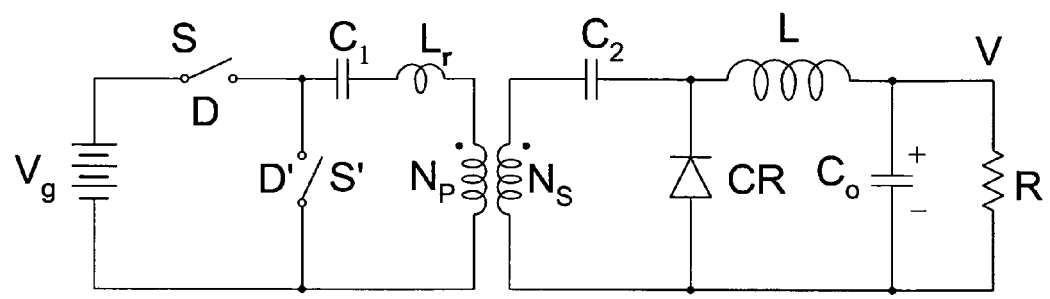
FIG. 28a illustrates another isolated and polarity non-inverting embodiment with the resonant inductor $L_r$ placed in series with the primary side capacitor $C_1$ and FIG. 28b illustrates another isolated and polarity inverting embodiment with the resonant inductor $L_r$ placed in series with the primary side capacitor $C_1$.
Figure 28B:
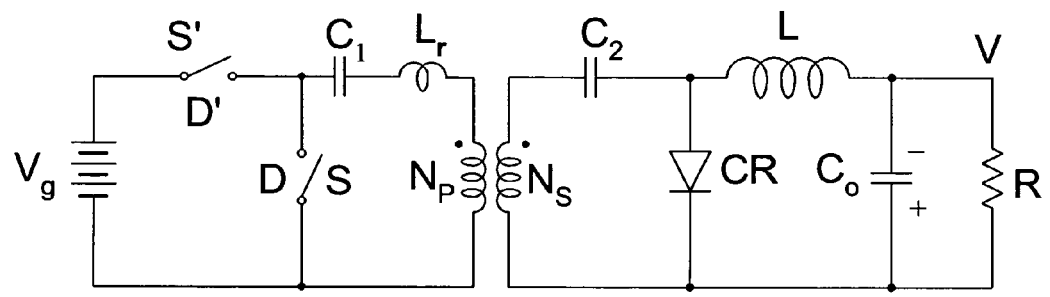

Of particular practical interest are the isolated extensions of the converters in FIG. 26a and FIG. 26b shown in FIG. 28a and FIG. 28b respectively. The resonant inductor can be placed in either primary side or secondary side. However, since the secondary side is usually low voltage high current, the primary side is preferred, as resonant inductor would be designed for the low current. An added advantage is that the resonant inductor is then also in the position identical to that of the transformer leakage inductor. Since the leakage inductor is usually rather small and on the same order as the resonant inductor, the converter practical implementation can be further simplified by, in fact, eliminating entirely the resonant inductor. The role of resonant inductor would then be taken over by the built-in leakage inductance of the isolation transformer. The drawback is that this would also impose an additional constraint on the design, as the resonant inductor value could not be chosen to optimize design.

Figure 29A:
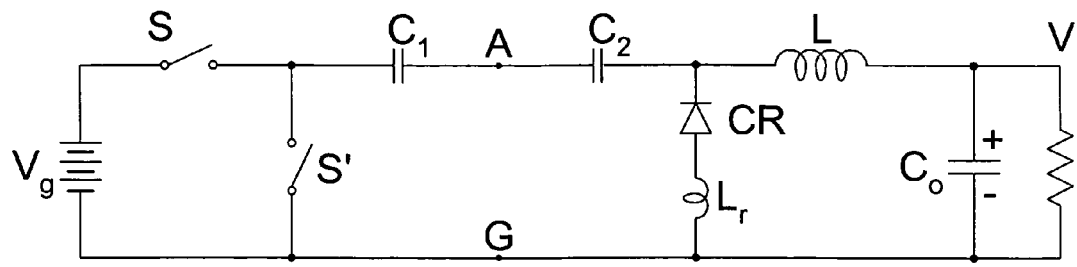
FIG. 29a illustrates the non-isolated and non-inverting embodiment of the present invention of FIG. 7a in which energy transfer capacitor C is split in two in-series capacitors $C_1$ and $C_2$.
Figure 29B:
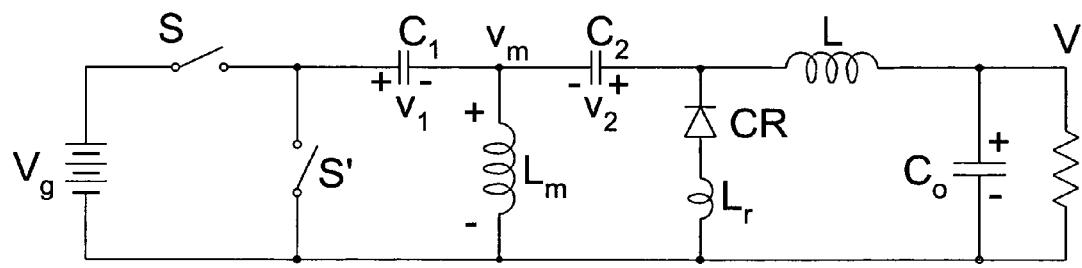
FIG. 29b illustrates converter of FIG. 29a with inserted magnetizing inductance $L_m$.

We now go back to the original position of the resonant inductor in the branch with the diode CR as illustrated in FIG. 29a. By splitting the capacitor C of FIG. 7a into two capacitors $C_1$ and $C_2$ in series as in FIG. 29a leads to natural placement of the transformer magnetizing inductance $L_m$ between nodes A and G such as in FIG. 29b. By the very placement of the inductor $L_m$ it cannot have any DC bias, due to capacitive coupling from both sides. Therefore, the respective transformer replacing the magnetizing inductance would have no DC current bias and no DC energy storage. We could determine the steady-state values of capacitors $C_1$ and $C_2$ needed by writing two sets of volt-second balance equations, one for ON-time interval, and another for OFF-time interval. However, there is a shorter and more revealing method of their determination. Note that in the loop consisting of $C_2$, $L_m$, L, and $C_0$, the two inductors are effectively short for DC analysis. Thus, summation of the DC voltages in that loop imposes the following condition:

$$V_2 = V = DV_g \quad (45)$$

Hence, the secondary side energy transferring capacitor C must have the same voltage as output DC voltage for all operating condition. We also know that for OFF-time interval a resonant switched circuit will be formed with resonant inductor $L_r$ such that the net DC voltage in this resonant circuit must be zero, from which based on the adopted positive polarity voltages as in FIG. 29b:

$$V_1 = V_2 = DV_g \quad (46)$$

Figure 29C:
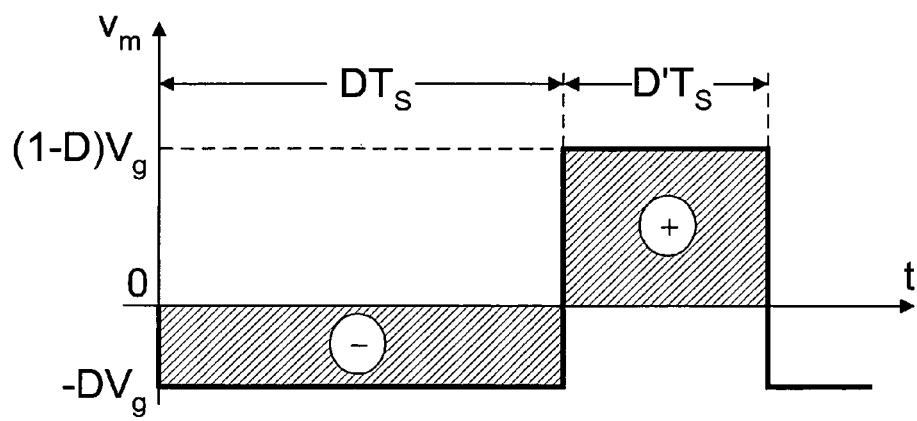
FIG. 29c illustrates a voltage waveform and volt-seconds balance across magnetizing inductance $L_m$ in FIG. 29b.

From (45) and (46) one can now draw the transformer magnetizing inductance waveform as in FIG. 29c. Note how the presence of the resonant inductor $L_r$ does not in any way effect transformer volt-second balance shown in FIG. 29c, as it is directly determined by the two switches S and S' and their out of phase drive and DC voltage on capacitor $C_1$. The same holds true for the output inductor L, which has the identical voltage waveform as magnetizing inductance $L_m$. This will be later on used as justification for coupling output inductor and transformer into an Integrated Magnetics structure.

Figure 30A:
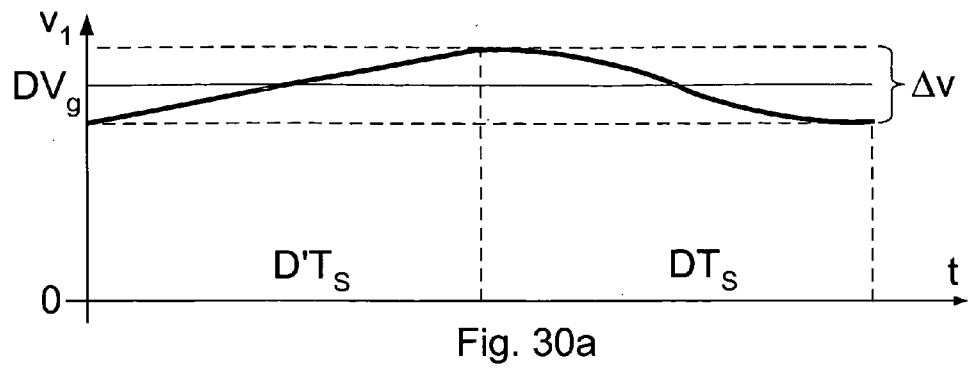
FIG. 30a illustrates instantaneous voltage waveform across capacitor $C_1$ in FIG. 29b.
Figure 30B:
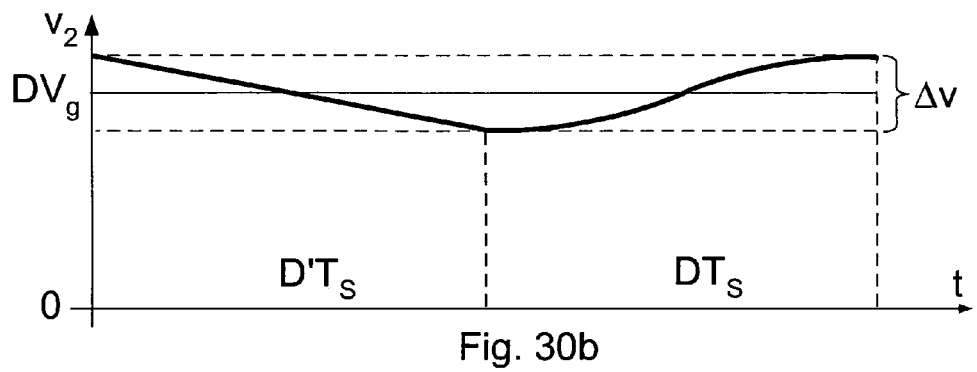
FIG. 30b illustrates instantaneous voltage waveform across capacitor $C_2$ in FIG. 29b.
Figure 30C:
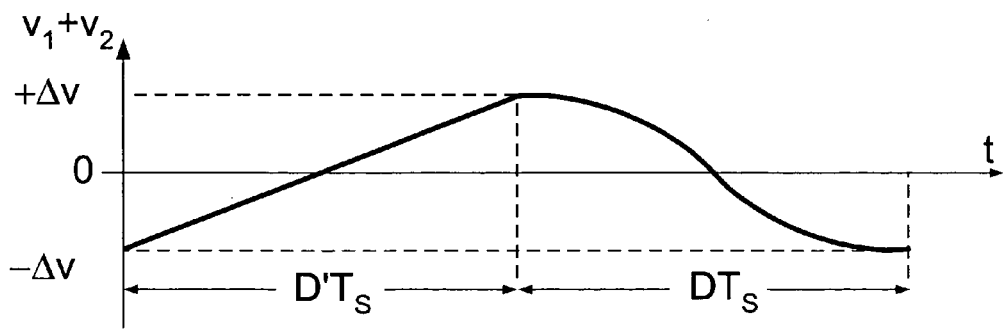
FIG. 30c illustrates the sum of the two instantaneous voltage waveforms from FIG. 30a and FIG. 30b.
Figure 30D:
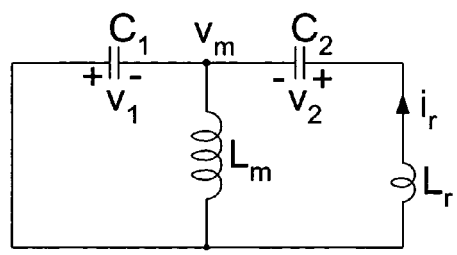
FIG. 30d illustrates the switching circuit of converter in FIG. 29b during resonant time interval when complementary switch S' is closed.

From (46), the DC voltages on two energy-transferring capacitors must be equal. However, their instantaneous voltages are not equal as illustrated in FIG. 30a and FIG. 30b. In fact, during ON-time interval the capacitor $C_1$ is charging linearly, while capacitor $C_2$ is at the same time discharging with opposite rate of discharge, so that at the end of ON-time interval, there is a net difference equal to the AC ripple voltage on this capacitance as illustrated in FIG. 30c. This ripple voltage $\Delta v$ is initial voltage on capacitor at the onset of the resonant circuit operation of FIG. 30d.

Note that this ripple voltage $\Delta v$ is intentionally displayed large in FIG. 30a and FIG. 30b in order to clearly show the linear and sinusoidal change, where in practice this ripple voltage is only a fraction of the DC voltage $V_g$, as it represents typically only 5% to 10% of the DC value. The circuit model during the ON-time interval is again the resonant circuit of FIG. 30d. Note however, that despite large DC voltage level of each capacitor, the net voltage on two capacitors in series is their difference thus resulting in only an ac voltage mismatch of $\Delta v$ as shown in FIG. 30c, which therefore leads to the same resonant converter analysis for the non-isolated converter derived before. Once again, the resonant inductor $L_r$ presence insures that the small ripple voltage difference $\Delta v$ between two capacitors is not dissipated in a lossy manner but instead circulated in a lossless manner during the OFF-time interval. In addition, the resonance returns the capacitor value to the same one as at the beginning of ON-time interval. Clearly, the magnetizing inductance $L_m$ in FIG. 29b can be replaced by a two winding transformer to result in the isolated step-down converter of FIG. 9a.

Detailed Analysis of the Polarity-Inverting Isolated Converter

Figure 31A:
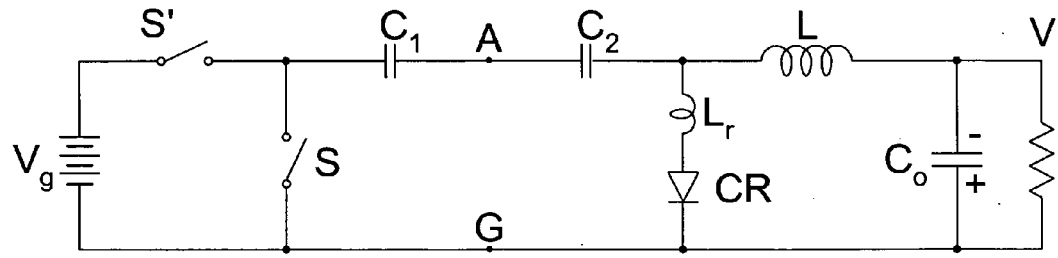
FIG. 31a illustrates the non-isolated and polarity-inverting embodiment of the present invention of FIG. 7b in which energy transfer capacitor C is split in two in-series capacitors $C_1$ and $C_2$.
Figure 31B:
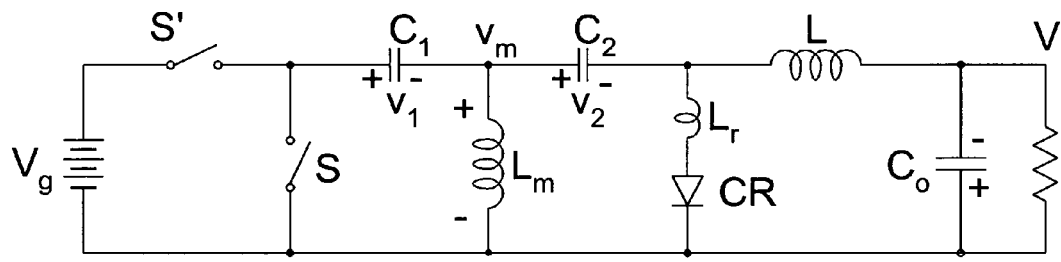
FIG. 31b illustrates converter of FIG. 31a with inserted magnetizing inductance $L_m$.

The isolation transformer is introduced into the polarity-inverting converter in the same way by splitting the capacitor C into two capacitors as in FIG. 31a and inserting a magnetizing inductance $L_m$ as in FIG. 31b. Once again we follow a shorter and more revealing method for determination of the steady state values $V_1$ and $V_2$ of energy transferring capacitors $C_1$ and $C_2$.

Figure 31C:
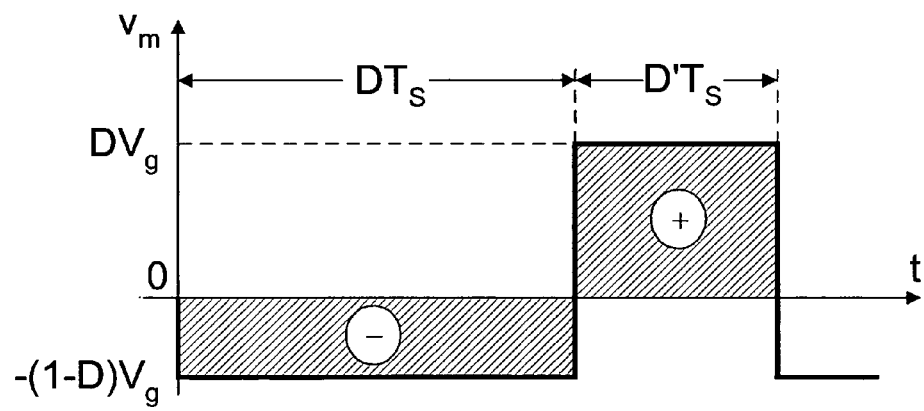
FIG. 31c illustrates a voltage waveform and volt-seconds balance across magnetizing inductance $L_m$ in FIG. 31b.

The summation of DC voltages around the closed loop consisting of $L_m$, $C_2$, L and $C_0$, results in:

$$V_2 = V \quad (47)$$

since the two inductors are effectively short for this DC analysis. The secondary side capacitor must be charged to the same DC voltage as the output DC voltage and have the polarity as indicated in FIG. 31b. Once again we can write a volt-second balance condition and determine the voltage $V_1$ on capacitor $C_1$ to be $V_1 = (1-D)V_g$, which results in volt-second balance waveform displayed in FIG. 31c. Note that this results in the resonant circuit of FIG. 32d for the OFF-time interval for which:

$$V_g - V_1 - V_2 = 0 \quad (48)$$

Figure 32A:
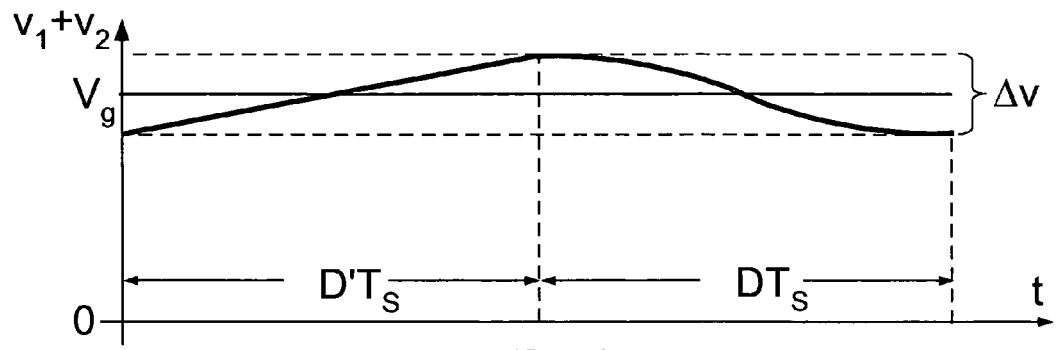
FIG. 32a illustrates sum of instantaneous voltages on capacitor $C_1$ and $C_2$ in FIG. 31b.
Figure 32B:
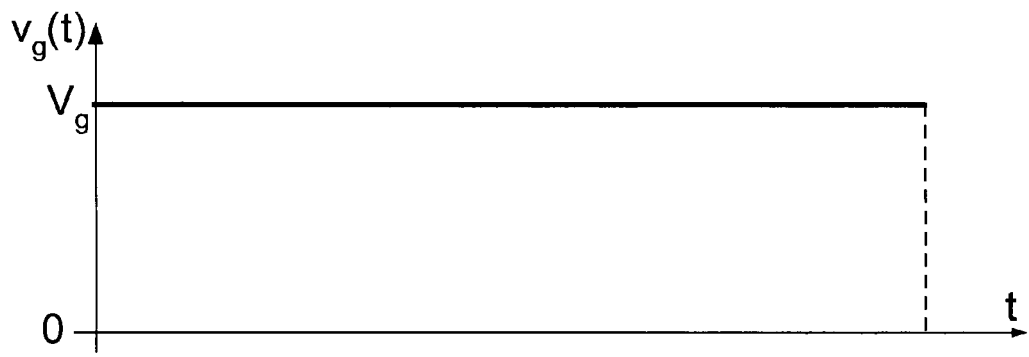
FIG. 32b illustrates input DC voltage $V_g$ FIG. 31b.
Figure 32C:
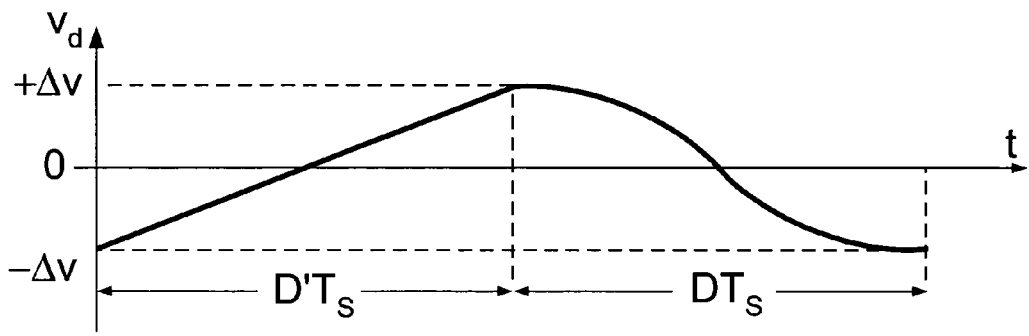
FIG. 32c illustrates a difference of the voltage waveforms from FIG. 32a and FIG. 32b.
Figure 32D:
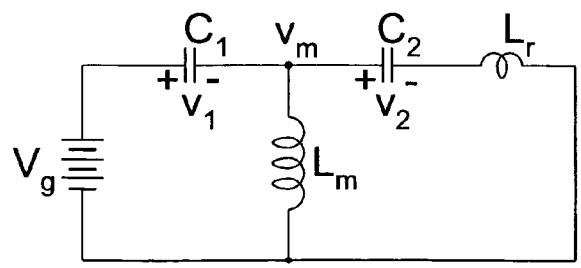
FIG. 32d illustrates switching circuit of converter in FIG. 31b during resonant time interval when complementary switch S' is closed.

Once again, the instantaneous sum of two capacitor DC voltages has the same DC value as the input DC voltage $V_g$ as seen in FIG. 32a and FIG. 32b, which cancel to result in AC ripple voltage only as seen in FIG. 32c. Hence one prerequisite of hybrid switching is once again fulfilled and that is that the resonant circuit operates only with a net zero DC voltage and is excited only by the small ripple voltage $\Delta v$ on capacitors as before and as shown in FIG. 32c.

Isolation Transformer Advantages

All single-sided (non-bridge type on primary side) prior-art converters with step-down DC gain characteristic of D, resulted in a non-ideal transformer features such as:

1. DC energy storage in transformer such as AHB converter;
2. Transformer whose excitation in the high duty ratio range results in very high reset voltage and correspondingly high voltage stresses on the switches as well as very limited input voltage range.

The bridge-type converters on the other hand result in the use of four switches on the primary and four switches on the secondary side (higher conduction losses and cost) and in poor transformer winding utilization as the windings are for most part of the switching interval idling and not transferring any power to the load. This was the price paid to achieve their volt-second balance.

The present invention for the first time results in single-sided converter, which eliminates all of these problems as the isolation transformer operates as nearly ideal component:
1. No DC energy storage;
2. Full utilization of the windings;
3. Much lower flux density than comparable prior-art converters, thus resulting in substantially reduced magnetics size and decreased magnetics losses.

The first two advantages have already been highlighted. The third advantage is explained in more details in the next section.

Transformer Size Comparisons

Figure 33A:
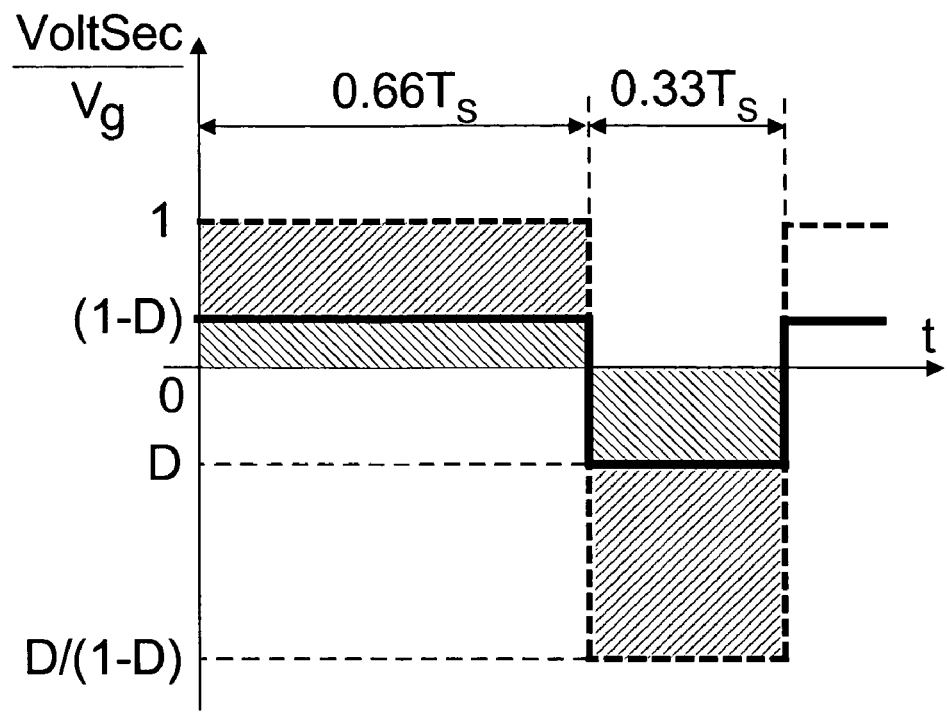
FIG. 33a illustrates a voltage waveform of the transformer for two different converters: a) dotted line is for the forward converter b) heavy lines are for present invention.

We will now compare the size of the key magnetics component, the isolation transformer, with the forward and AHB converter. Transformer voltage excitation in the two converters are illustrated in FIG. 33a: dotted lines are for forward converter and full lines are for present invention. Note how the increase of duty ratio excitation for the forward converter results in proportional increase of the volt-seconds, which with the reduction of reset time leads to very large reset voltages and ultimately to high stresses on switches.

Comparison at particular duty ratio of D=0.66 shown in FIG. 33a reveals direct effect on the size of the magnetics. The total Volt-seconds are three times bigger for forward converter than for the present invention, clearly resulting in three times larger flux density and more than 10 time larger core losses. On the other hand a core cross-section three times smaller could be used in present invention.

As the voltage excitation of the AHB is identical to present invention one would infer that it has the same size advantages. However, that is not the case, as the detailed analysis below reveals that it has the same size limitations as the forward converter. The reason for that is that one must evaluate the volt-seconds (VS) in terms of one common quantity, and that is output regulated DC voltage V.

$$\text{Forward converter: } VS = V_g D T_S = V T_S \quad (49)$$

$$\text{AHB converter: } VS = (1-D) D V_g T_S = V T_S \quad (50)$$

Thus, AHB converter appeared to have lower volt-seconds than forward converter due to product D(1−D). However, AHB converter DC voltage gain is:

$$V = D(1-D)V_g \quad (51)$$

By replacing (51) into (50) the same constant volt-seconds are obtained which are directly proportional to regulated output DC voltage V.

On the other hand, the volt-seconds VS for present invention are:

$$VS = D(1-D)V_g T_S \quad (52)$$

However, the DC voltage gain of the present invention is $$V = (1-D)V_g \quad (53)$$

Replacing (53) into (52) results in
Present invention $$VS = (1-D)V T_S = V T_S / RF \quad (54)$$

where the reduction factor is defined as;

$$RF = 1/(1-D) \quad (55)$$

and shows how many times is the flux in present invention reduced compared to that of prior-art converters. For example for D=0.66 illustrated in FIG. 33a and FIG. 33b the reduction factor is 3, so three times smaller core cross section could be used to result in much smaller magnetics size and further reduced losses, since smaller core has less total volume and proportionally less core loss. Similarly, smaller core results in lower winding length hence lower copper losses as well. Thus, both much smaller size and more efficient magnetics design can be realized at the same time.

Figure 33B:
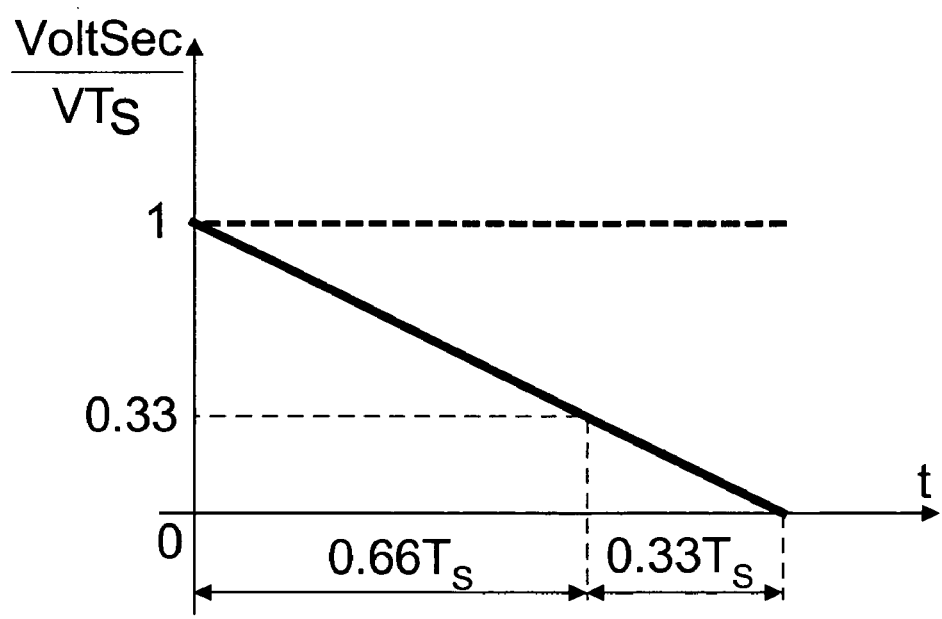
FIG. 33b illustrates the transformer volt-seconds (VS) as a function of operating duty ratio D for two converters: a) dotted lines are for forward b) heavy lines are for present invention.

Comparison of the volt-seconds are shown graphically in FIG. 33b in which dotted lines illustrate the flux density needs of forward and AHB converter and heavy line the flux density requirement for present invention. Note how with the increased duty ratio, the flux density requirements rapidly decrease, resulting in further magnetics size reduction, while in forward and AHB converter are constant and independent of operating duty ratio.

The highest magnetics design efficiency is obtained when the transformer is designed with one turn for secondary winding, such as, for example for 5V output. In that case, flux per turn is for forward and AHB converter equal to 5V per turn, or as is often said, the magnetics core is chosen so that it can support 5 Volts/turn flux. Note now a very severe limitation if one wants to use the same core for 15V output. In order to keep the same core losses, the designer than choose transformer with three turns for secondary resulting in the same flux of 5 Volts/turn. However, increase of secondary turns (and corresponding primary number of turns as well) from one to three in same window spacing would result in a very high increase of copper losses. The comparably much lower low flux in the present invention gives a very efficient alternative. Now 15V output voltage designs could also be made with a single turn and result in much reduced conduction losses and improved efficiency. This is very important for practical server power supplies, which require 12V output as well as for battery charger applications having 15V and higher output voltages. The present invention then offers both smaller size and more efficient magnetics designs.

The same reduced size and higher efficiency are also directly applicable to the output inductor, as it has the same voltage waveforms excitation of FIG. 33a as the isolation transformer. The identical voltage excitations also make possible integration of the transformer and output inductor on the common core as describe in later section.

The next section demonstrates how the reductions of the magnetics size goes hand in hand with the simultaneous reduction of the voltage stresses on the switches. Thus, by operating in the optimum operating region, both smaller size magnetics, higher efficiency magnetics, and lower voltage stresses of output switch with reduced conduction losses can be obtained simultaneously.

Comparison of the Voltage Stresses of Output Switches

Figure 34A:
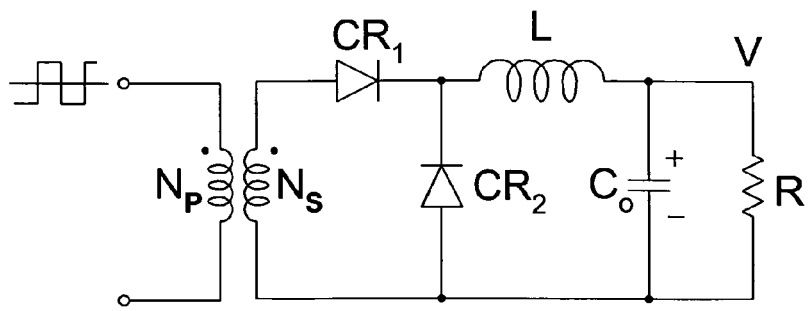
FIG. 34a illustrates the secondary side rectification of the forward and AHB converters.
Figure 34B:
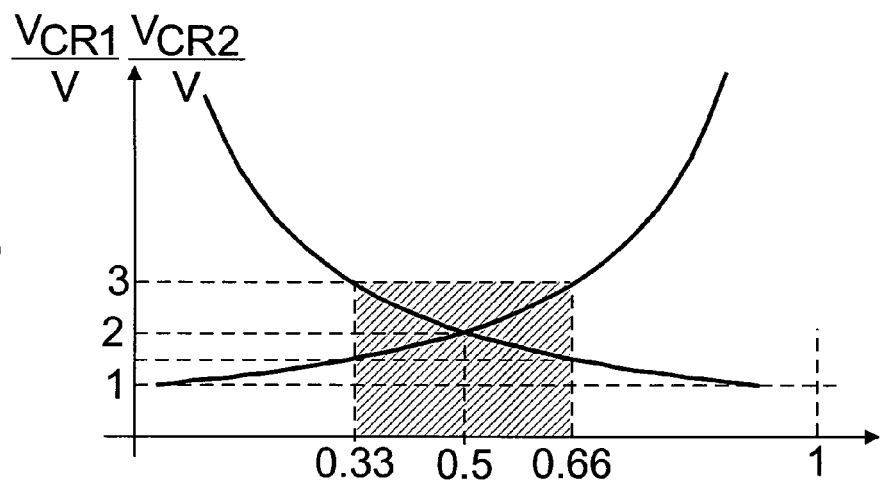
FIG. 34b illustrates voltage stresses of the secondary side switches in forward converter.
Figure 34C:
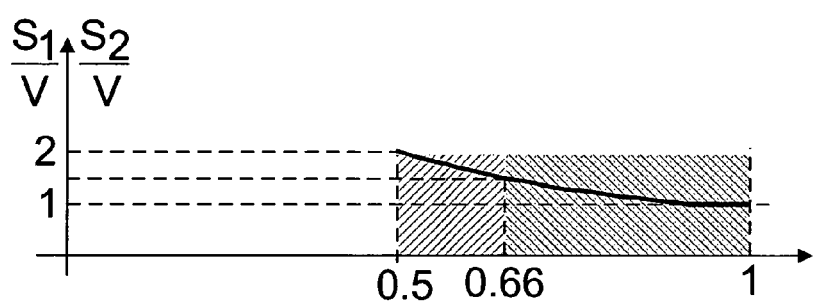
FIG. 34c illustrates the voltage stress of the diode switch of the present invention.
Figure 34D:
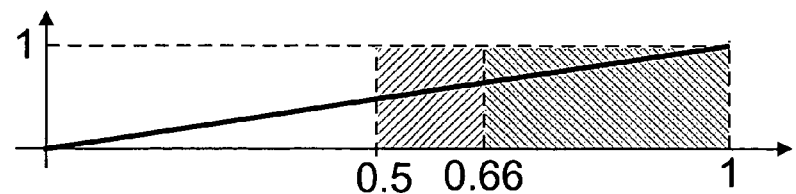
FIG. 34d is the DC voltage gain of forward converter and present invention.

One of the key limitations of the prior-art converters is in the excessive voltage stresses of the output current rectifier switches. The secondary side rectification of the prior-art forward and AHB converters shown in FIG. 34a results in excessive voltage stresses of the output switches as illustrate in FIG. 34b. For example, for 12V output, the switches with 60V or even 80V rating must be utilized. The present invention operating at duty ratio D=0.66 as illustrated in FIG. 34c would result in only 50% higher voltage stress than the output DC voltage or 18V. Considering the stressless switching of the single diode switch, which turns ON and turns OFF under ideal conditions (zero voltage and zero current), one can safely use 30V rated switches. Therefore, the prior-art converters would result in at least four times higher conduction losses as 60V rated switches have four times higher ON-resistance than 30V rated switches.

Simultaneous Reduction of Magnetic Size and Voltage Stresses

The present invention was shown to have two unique features not present in prior-art converters:
1. Substantial magnetic size reduction;
2. Very low voltage stresses on all switches.

Figure 35A:
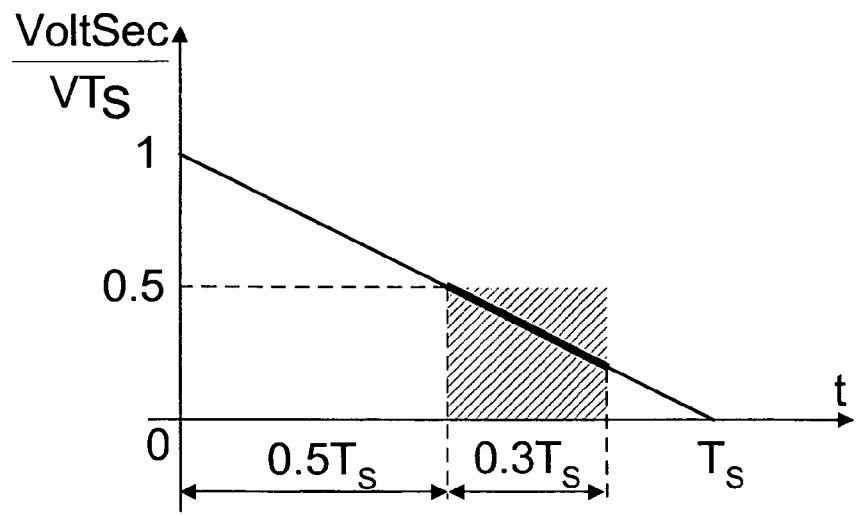
FIG. 35a shows the graph of Volt-seconds of the transformer of present invention as a function of operating point.
Figure 35B:
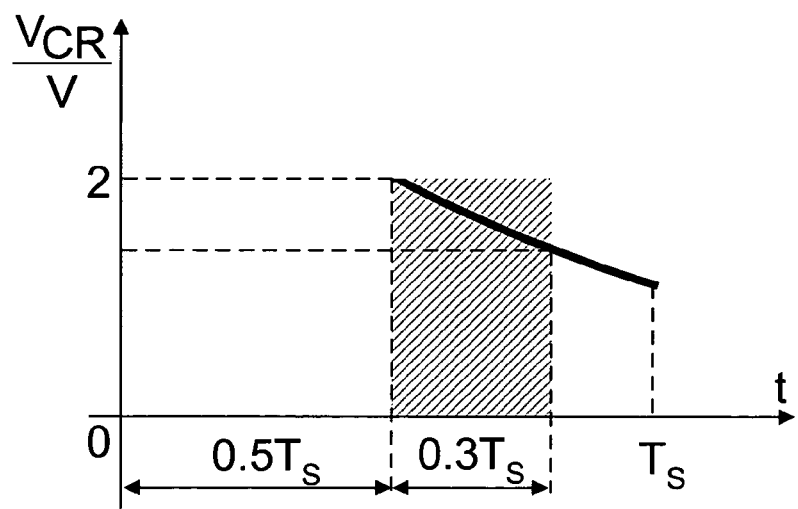
FIG. 35b illustrates the voltage stress of the diode of the present invention as a function of the operating point.

Now we will demonstrate that both unique advantages are obtained simultaneously and that lower magnetics size is also followed at the same time by lower stresses on the output diode switch as illustrated by the shaded area in FIG. 35a and FIG. 35b. Note that the operation at higher duty ratios leads at the same time to lower flux in the magnetics and lower voltage stress of the output switch. For example, the operation at D=0.66 results in three times reduction of the flux compared to prior-art converters. It also at the same time results in voltage stress on output switch, which is only 50% higher than output DC voltage.

Therefore, the two problems limiting the efficiency of computer server power supplies are simultaneously eliminated. Operation at this operating point allows for transformer to be designed with only one turn secondary and still use the core size normally reserved for 5V outputs. Furthermore, the output switch can be implemented with a 30V rated switches instead of 80V rated switches used in prior-art converters. This together with the elimination of switching losses of all three switches results in efficiency substantially increased compared to the prior-art converters. Furthermore, the efficiency improvements come with the simultaneously reduced cost as the lower voltage rated switches are less expensive. Similarly smaller size magnetics and single turn use result in the reduced magnetics cost as well.

From the graphs in FIG. 35a and FIG. 35b one might conclude that the optimum operation would be at duty ratio near 1 as the magnetics size would be the smallest and voltage stress would be the smallest. However, the rms currents would start to increase substantially in that area thus diminishing advantages. Therefore, the optimum operating region is limited to the duty ratio of around D=0.8 as illustrated by the shaded area in FIG. 35a and FIG. 35b.

Integrated Magnetics

Figure 36A:
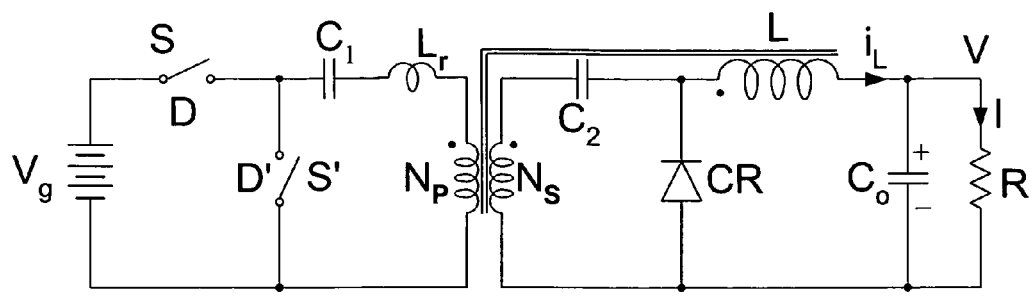
FIG. 36a is circuit schematics of the Integrated Magnetics extension of the present invention.
Figure 36B:
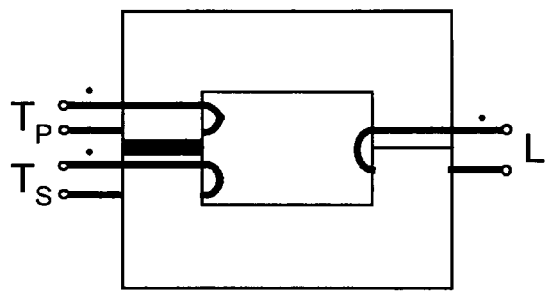
FIG. 36b is the Integrated Magnetics implementation for the converter in FIG. 36a, FIG. 36c shows the low ripple output voltage under the zero ripple current condition.
Figure 36C:
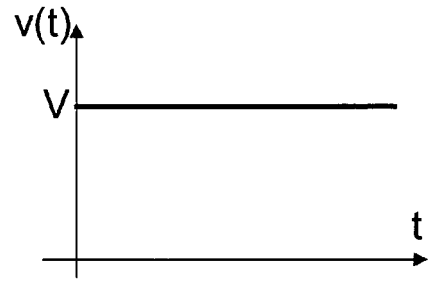
FIG. 36d illustrates the output ripple current before magnetic coupling (dotted line) and after magnetic coupling (heavy lines) into an Integrated Magnetics structure of FIG. 36b.
FIG. 36e shows the component of current in switch S' which help eliminate switching losses during second (D' to D) transition.
Figure 36D:
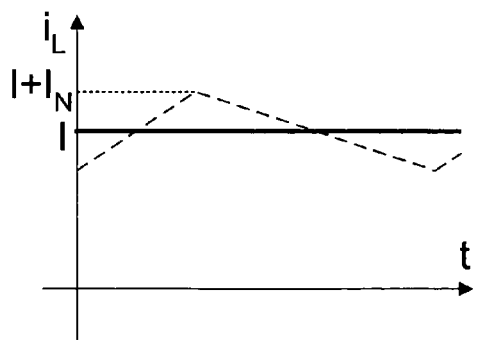

The identical voltage waveforms of the isolation transformer and the output inductor permit their integration as shown in Integrated Magnetics extension of FIG. 36a, in which the isolation transformer and output inductor are coupled together into a single Integrated Magnetic of FIG. 36b. By placing the transformer on the magnetic leg with an air-gap, and output inductor on the un-gapped leg, the ripple current is steered from the output inductor (FIG. 36d) into the transformer primary. The resulting zero ripple output inductor current also leads to very small output ripple voltage of typically 20 mV for 12V output. Thus, output voltage in FIG. 36c is shown to be essentially DC voltage with negligible ripple.

Figure 36E:
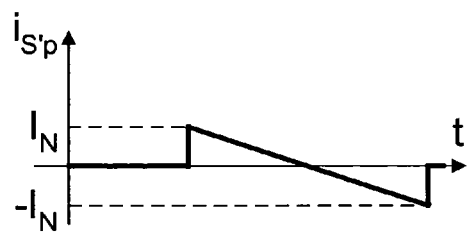

Another side benefit of ripple steering is that the switch S' will now have some finite negative current at the end of switching interval to help with zero voltage switching of switch S even when the switch S' would otherwise have zero current at that instant since the resonant current is reduced to zero at that instant such as illustrated in FIG. 36e.

Experimental Verification

The experimental prototype of a 600 W, 400V to 12V converter is built to verify several unique advantages of the converter such as:
1. Magnetics design with only one turn for 12V output;
2. Use of the 30V rated switches for 12V output;
3. Streesless switching operation of the secondary side switch;
4. Use of 500V switches for 400V input voltage;
5. Elimination of the switching losses of the primary side switches.

Figure 37A:
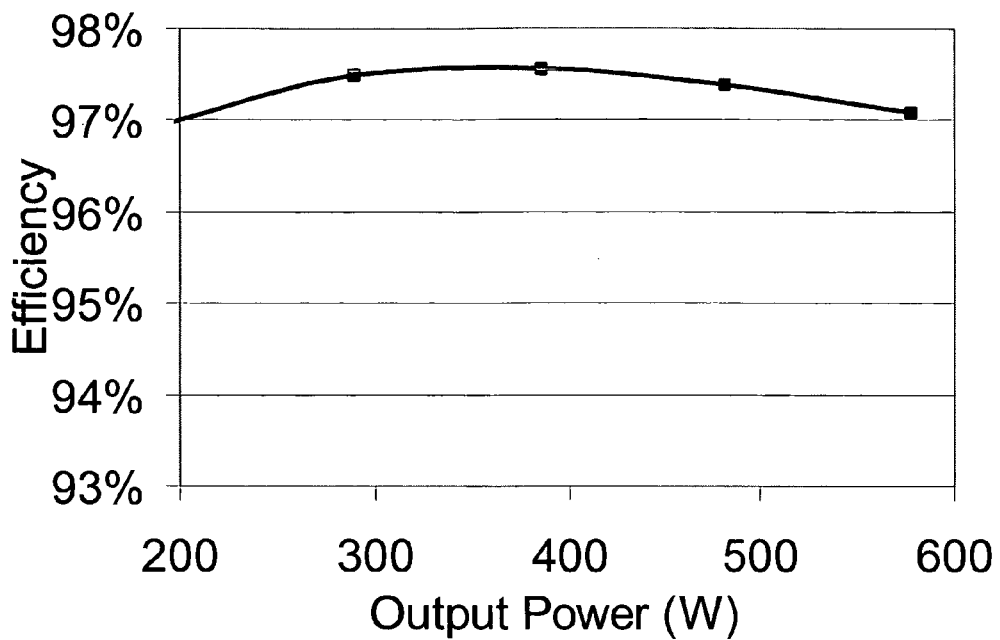
FIG. 37a shows the efficiency measurement results made on a 600 W prototype.
Figure 37B:
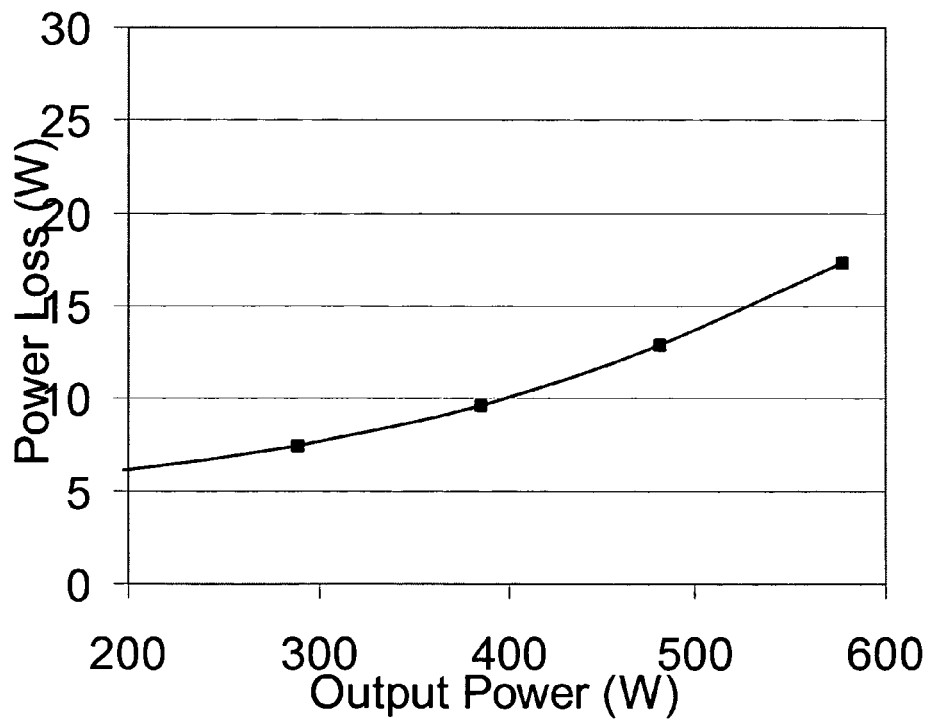
FIG. 37b shows the power losses measured on 600 W prototype.
Figure 38A:
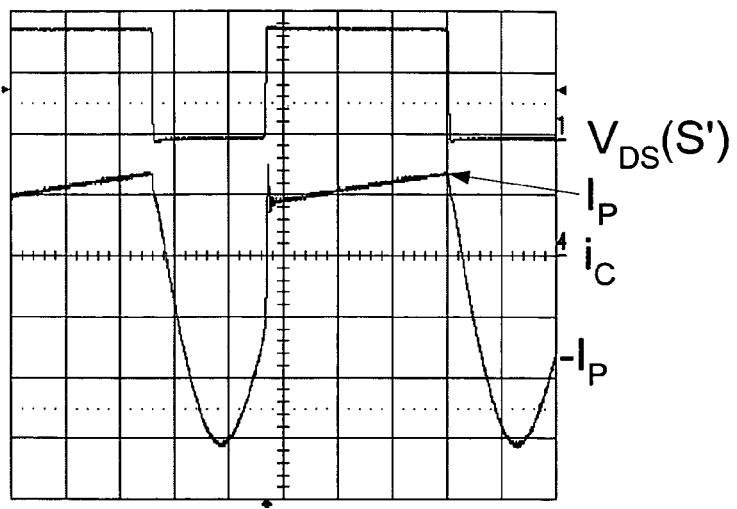
FIG. 38a illustrates the stressless switching of the primary side switches of the 600 W prototype at full load current.
Figure 38B:
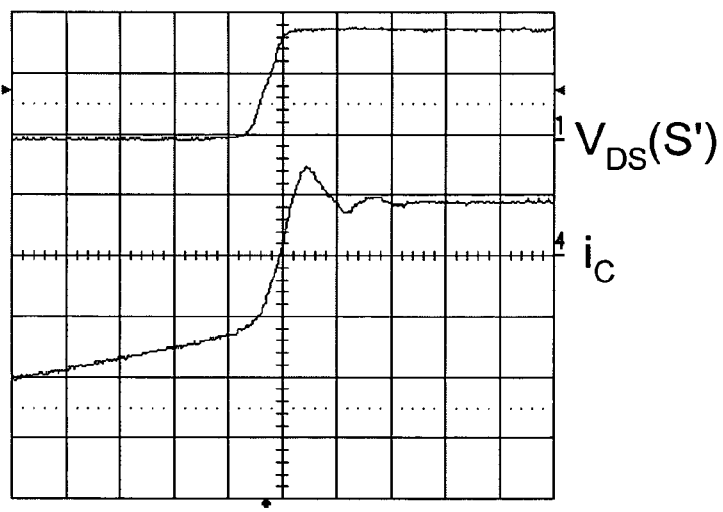
FIG. 38b shows the enlarged first transition (D to D') and zero voltage switching of switch S'.
Figure 38C:
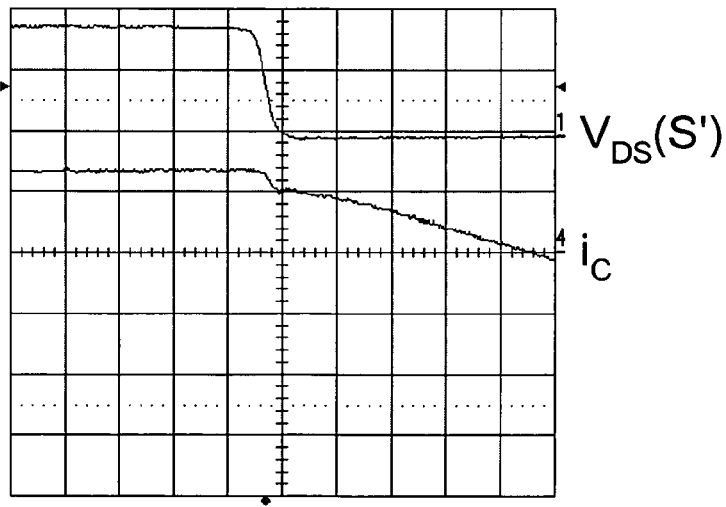
FIG. 38c shows the enlarged second transition (D' to D) and zero voltage switching of switch S.

All these features are experimentally verified and result in very high efficiency as shown in FIG. 37a and power loss measurements in FIG. 37b for a wide power output range from 200 W to near 600 W. The switching performance was measured and shown in FIGS. 38a-c, which confirms the switching loss elimination of primary side switches.

Conclusion

A new hybrid-switching power conversion method was introduced, which consists of an square-wave interval in which switch voltage and current waveforms are square-wave and an resonant interval, in which the resonant current waveforms of the switches are accompanied with a switch voltage waveforms, which are almost square-wave, except for super-imposed small resonant ripple voltage.

What is claimed is:

1. A switching DC-to-DC converter for providing power from a DC voltage source connected between an input terminal and a common terminal to a DC load connected between an output terminal and said common terminal said converter comprising:
an input switch with one end connected to said input terminal;
an inductor with one end connected to said output terminal;
a capacitor with one end connected to another end of said input switch and another end connected to said inductor another end thereof;
a complementary input switch with one end connected to said common terminal and another end connected to said one end of said capacitor;
a resonant inductor with one end connected to said another end of said capacitor;
an output switch with one end connected to said common terminal and another end connected to said resonant inductor another end thereof;
switching means for keeping said input switch ON for a duration of time interval $DT_S$, keeping it OFF for a complementary duty ratio interval $D'T_S$, where D is a duty ratio and D' is a complementary duty ratio within one complete and controlled switch operating cycle $T_S$;
wherein said input switch, and said complementary input switch are semiconductor switching devices such as bipolar transistors or MOSFET transistors;
wherein said output switch is a diode, having said one end of the output switch being an anode and said another end being a cathode, capable of conducting the current in one direction while in an ON-state, and sustaining voltage in opposite direction, while in an OFF-state;
wherein said semiconductor rectifier anode end is connected to the common terminal and the cathode end is connected to said resonant inductor another end so as to result in positive output DC voltage between output terminal and common terminal for the positive DC source between input terminal and common terminal;
wherein said switching means include precise electronically controlling operation of said complementary input switch relative to said input switch, whereby two transition intervals, a first transition interval and a second transition interval are created during which both said input switch and said complementary input switch are turned OFF during each successive said switch operating cycle $T_S$, wherein said first and said second transition intervals are short compared to said switch operating cycle $T_S$;

wherein a DC-to-DC voltage conversion ratio of said converter depends linearly on said operating duty ratio D;

whereby within a whole said duty ratio D, voltages across said input switch and said complementary input switch are equal to a voltage of said DC voltage source, and whereby within a whole said duty ratio D, voltage across said output switch is equal to voltage between said output terminal and said common terminal divided by the operating duty ratio D resulting in reduced and low voltage stress for higher duty ratios.

2. A converter as defined in claim 1,
wherein said resonant inductor is removed from the branch with the diode rectifier and replaced by a short;
wherein the said resonant inductor is then placed in the branch with the complementary input switch and in series with it.

3. A converter as defined in claim 1,
wherein said resonant inductor is removed from the branch with the diode rectifier and replaced by a short;
wherein the said resonant inductor is then placed in the branch with the capacitor and in series with it.

4. A converter as in claim 1,
wherein the output diode switch is replaced by a MOSFET transistor operating as a synchronous rectifier to reduce the conduction losses and increase efficiency for applications where low DC output voltage is needed.

5. A converter as defined in claim 1,
wherein said switching means are adjusted for keeping said input switch ON for said complementary duty ratio interval $D'T_S$, and keeping it OFF for a duration of said time interval $DT_S$;
wherein connection of said anode and said cathode were exchanged having said anode connected to said resonant inductor another end thereof and said cathode connected to said common terminal, and
whereby a voltage between said output terminal and said common terminal is of opposite polarity to a voltage of said DC voltage source.

6. A converter as defined in claim 2,
wherein said resonant inductor is removed from the branch with the diode rectifier and replaced by a short;
wherein the said resonant inductor is then placed in the branch with the input switch and in series with it.

7. A converter as defined in claim 2,
wherein said resonant inductor is removed from the branch with the diode rectifier and replaced by a short;
wherein the said resonant inductor is then placed in the branch with the capacitor and in series with it.

8. A converter as in claim 2,
wherein the output diode switch is replaced by a MOSFET transistor operating as a synchronous rectifier to reduce the conduction losses and increase efficiency for applications where low DC output voltage is needed.

9. An isolated switching DC-to-DC converter for providing power from a DC voltage source connected between an input terminal and a common input terminal to a DC load connected between an output terminal and a common output terminal, said converter comprising:

an isolation transformer with primary and secondary windings, each winding having one dot-marked end and another unmarked end, wherein said unmarked end of primary winding is connected to said common input terminal and said unmarked end of secondary winding is connected to said common output terminal, whereby any AC voltage applied to said primary winding of said isolation transformer induces AC voltage in said secondary winding of said isolation transformer so that both AC voltages are in phase at dot-marked ends of said primary and secondary windings of said isolation transformer;

an input switch with one end connected to said input terminal;

an inductor with one end connected to said output terminal;

a first capacitor with one end connected to another end of said input switch and another end connected to said dot-marked end of said primary winding;

a complementary input switch with one end connected to said common input terminal and another end connected to said one end of said first capacitor;

a second capacitor with one end connected to another end of said inductor and another end connected to said dot-marked end of said secondary winding;

a resonant inductor with one end connected to said one end of said second capacitor;

an output switch with one end connected to said common output terminal and another end connected to said resonant inductor another end thereof;

switching means for keeping said input switch ON for a duration of time interval $DT_S$, keeping it OFF for a complementary duty ratio interval $D'T_S$, where D is a duty ratio and D' is a complementary duty ratio within one complete and controlled switch operating cycle $T_S$;

wherein said input switch, and said complementary input switch are semiconductor switching devices such as bipolar transistors or MOSFET transistors;

wherein said output switch is a diode, having said one end of the output switch being an anode and said another end being a cathode, capable of conducting the current in one direction while in an ON-state, and sustaining voltage in opposite direction, while in an OFF-state;

wherein said anode end of the output diode switch connected to the common output terminal and the cathode end connected to said resonant inductor another end so as to result in positive output DC voltage between output terminal and common output terminal for the positive DC source between input terminal and common input terminal;

wherein said switching means include precise electronically controlling operation of said complementary input switch relative to said input switch, whereby two transition intervals, a first transition interval and a second transition interval are created during which both said input switch and said complementary input switch are turned OFF during each successive said switch operating cycle $T_S$, wherein said first and said second transition intervals are short compared to said switch operating cycle $T_S$;

whereby the transition intervals can be adjusted to obtain zero voltage switching of the primary side switching during both transition and therefore eliminate or much reduce the switching losses of the primary side high voltage switches;

wherein a DC-to-DC voltage conversion ratio of said converter depends linearly on said operating duty ratio D;

wherein the output DC voltage in addition to duty ratio control is also scaled up or down in DC voltage by use of the transformer turns ratio for additional step-down or for step-up in voltage;

whereby within a whole said duty ratio D, voltage across said input switch and said complementary input switch is equal to a voltage of said DC voltage source, and whereby within a whole said duty ratio D, voltage across said output switch is equal to voltage between said output terminal and said common terminal divided by the operating duty ratio D resulting in reduced and low voltage stress of the output switch for higher duty ratios;

whereby the transformer AC flux is function of the operating duty ratio D;

whereby the operating duty ratio can be chosen so that the AC flux and therefore the transformer size proportionally reduced compared to the conventional converters, such as forward converter, asymmetric half bridge and bridge converters.

10. A converter as defined in claim 9, wherein the resonant inductor is removed from the diode branch and replaced by a short wherein the leakage inductance of the isolation transformer takes the role of the eliminated external resonant inductor;

whereby the implementation of the isolated converter is simplified by removal of separate external resonant inductor and whereby the resonant frequency and resonant interval are adjusted by selecting a proper value of said first capacitor as the leakage inductance of the isolation transformer is relatively fixed by transformer design.

11. A converter as in claim 9, wherein the output diode switch is replaced by a MOSFET transistor operating as a synchronous rectifier to reduce the conduction losses and increase efficiency for applications where low DC output voltage is needed.

12. A converter as defined in claim 9, wherein said switching means are adjusted for keeping said input switch ON for said complementary duty ratio interval $D'T_S$, and keeping it OFF for a duration of said time interval $DT_S$;

wherein connections of said anode end and said cathode end of output diode switch were exchanged having said anode end connected to said resonant inductor another end thereof and said cathode end connected to said common output terminal, and whereby a voltage between said output terminal and said common output terminal is of negative polarity for the positive polarity of the input voltage source between input terminal and common input terminal.

* * * * *